United States Patent [19]

Yamaguchi et al.

[11] Patent Number: 5,825,899
[45] Date of Patent: Oct. 20, 1998

[54] AUDIO DATA PROCESSING APPARATUS

[75] Inventors: Syoji Yamaguchi, Kawasaki; Ayumi Naito; Tomoharu Miyadai, both of Yokohama, all of Japan

[73] Assignee: Fujitsu Limited, Kawasaki, Japan

[21] Appl. No.: 612,160

[22] Filed: Mar. 7, 1996

[30] Foreign Application Priority Data

| Mar. 20, 1995 | [JP] | Japan | 7-061320 |
| Dec. 19, 1995 | [JP] | Japan | 7-330105 |

[51] Int. Cl.⁶ .................................. H04B 15/00
[52] U.S. Cl. ............................ 381/94.4; 381/119
[58] Field of Search ................... 381/119, 94.4; 364/723

[56] References Cited

U.S. PATENT DOCUMENTS

| 4,628,789 | 12/1986 | Fujimori | 381/118 |
| 4,719,833 | 1/1988 | Katoh et al. | |
| 5,416,264 | 5/1995 | Toda et al. | 84/603 |
| 5,621,805 | 4/1997 | Loh et al. | 381/119 |

FOREIGN PATENT DOCUMENTS

| 0 342 530 | 11/1989 | European Pat. Off. . |
| 2 552 958 | 5/1985 | France . |
| 389 784 | 1/1990 | Germany . |
| 55-6958 | 1/1980 | Japan . |
| 61-269408 | 11/1986 | Japan . |
| 63-106815 | 5/1988 | Japan . |
| 2-22927 | 1/1990 | Japan . |
| 3-1198 | 1/1991 | Japan . |
| 4-363922 | 12/1992 | Japan . |
| 5-62495 | 3/1993 | Japan . |
| 5-244103 | 9/1993 | Japan . |
| 5-252119 | 9/1993 | Japan . |

OTHER PUBLICATIONS

JEE Journal of Electronic Engineering, vol. 28 (1991), Tokyo JP, pp. 38–42, Teruo Fujino & Yohei Takane, *Digital Mixing Console Meets Professional Mixing Needs*.

Journal of the Audio Engineering Society, 1979 Oct., vol. 27, No. 10, New York, US, pp. 793–803, G.W. McNally, *Microprocessor Mixing and Processing of Digital Audio Signals*.

*Primary Examiner*—Forester W. Isen
*Attorney, Agent, or Firm*—Staas & Halsey

[57] ABSTRACT

A data processing circuit inputs and connects a plurality of digital audio input channels in parallel, time-divisionally individually processes data of each input channel at every period Tu that is determined by a standardized united sampling frequency 44.1 kHz, thereafter, performs a designated mixing, and outputs mixed data from a D/A converter 44 to a line. When the united sampling frequency 44.1 kHz and a sound source sampling frequency of audio data differ, an interpolating process is executed.

26 Claims, 38 Drawing Sheets

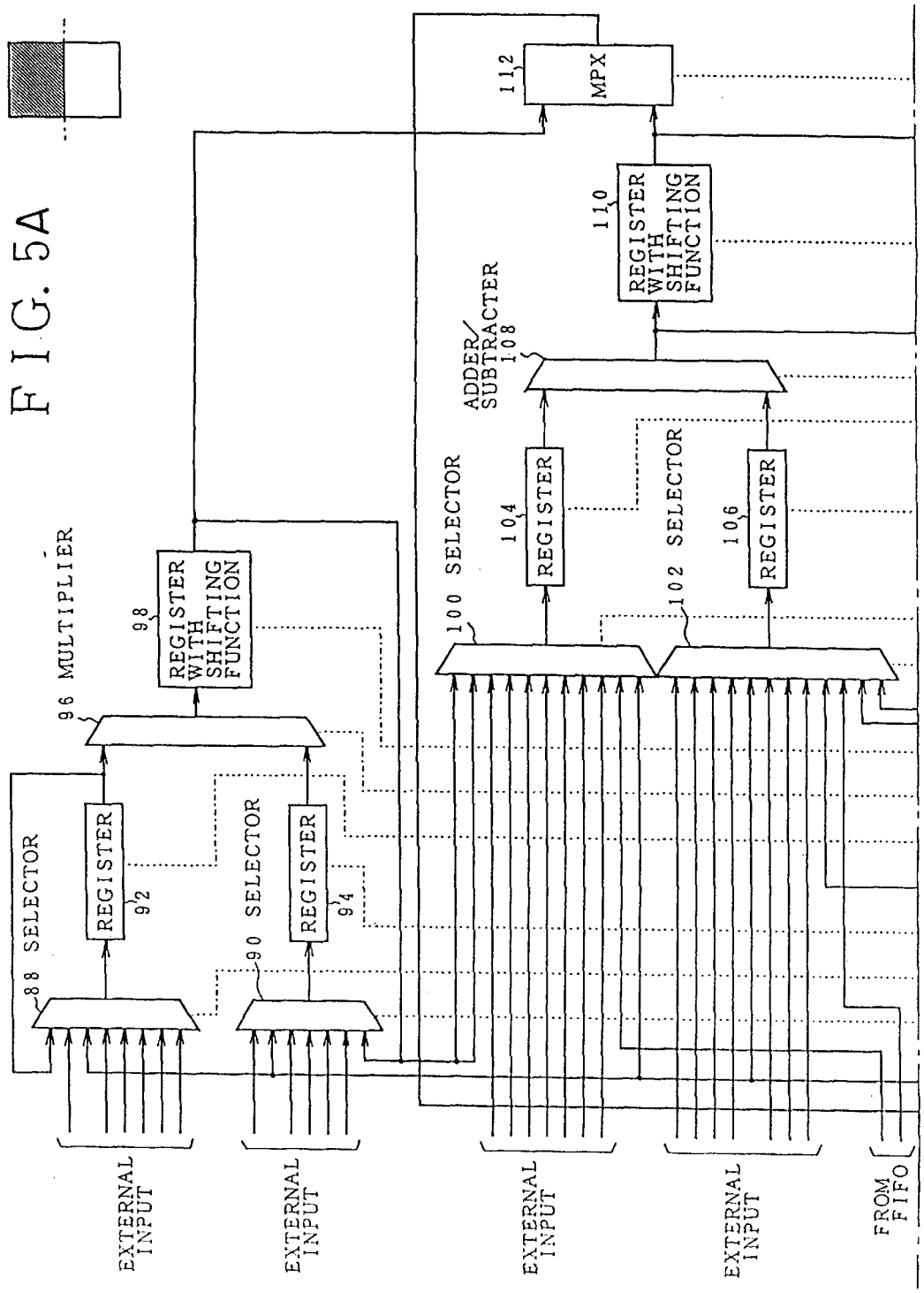

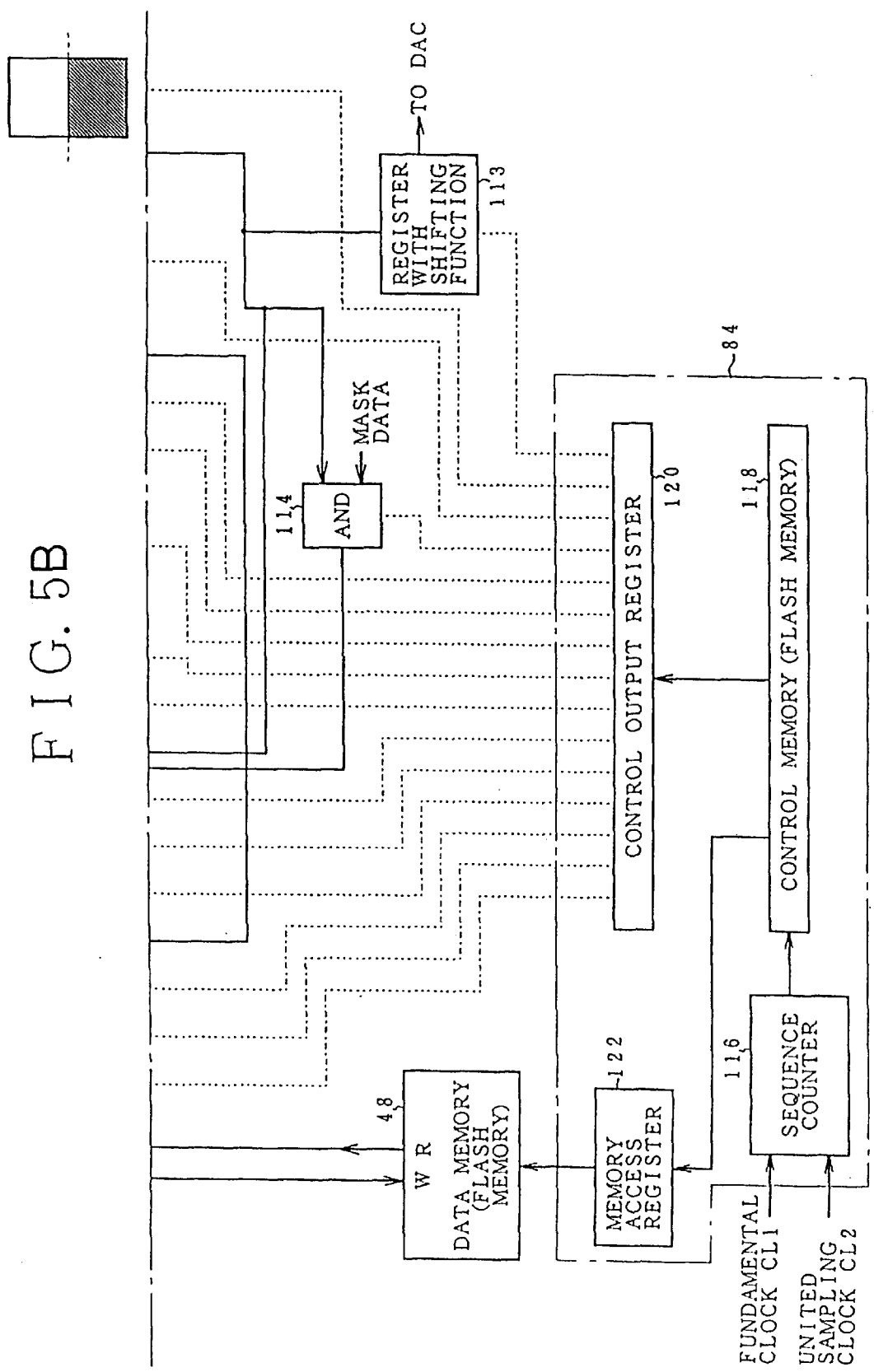

FIG. 9

| CONTROL CONTENTS | THE NUMBER OF NECESSARY STATES |
|---|---|
| SELECTION LATCH | 1 |
| MULTIPLICATION LATCH | 1 |
| ADDITION/SUBTRACTION LATCH | 1 |
| MEMORY READ | 1 |
| MEMORY WRITE | 1 |
| OUTPUT LATCH | 1 |
| OUTPUT SELECT | 1 |

TsxN-Tu ≧ cnt
D = Ts : SAMPLING CLOCK PERIOD
   Tu : UNITED CLOCK PERIOD
   N  : INTEGER PORTION OF (Ts/Tu) +1

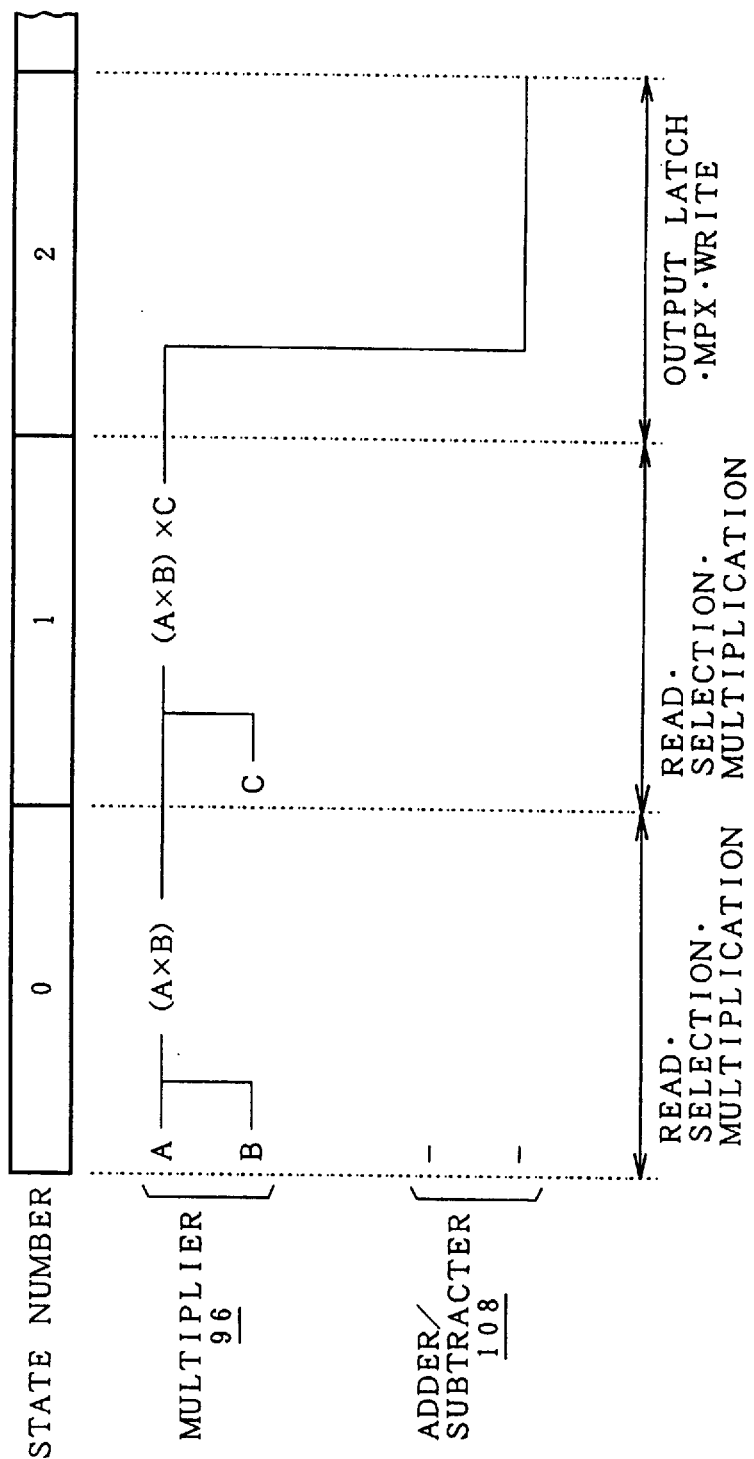

F I G. 1 8
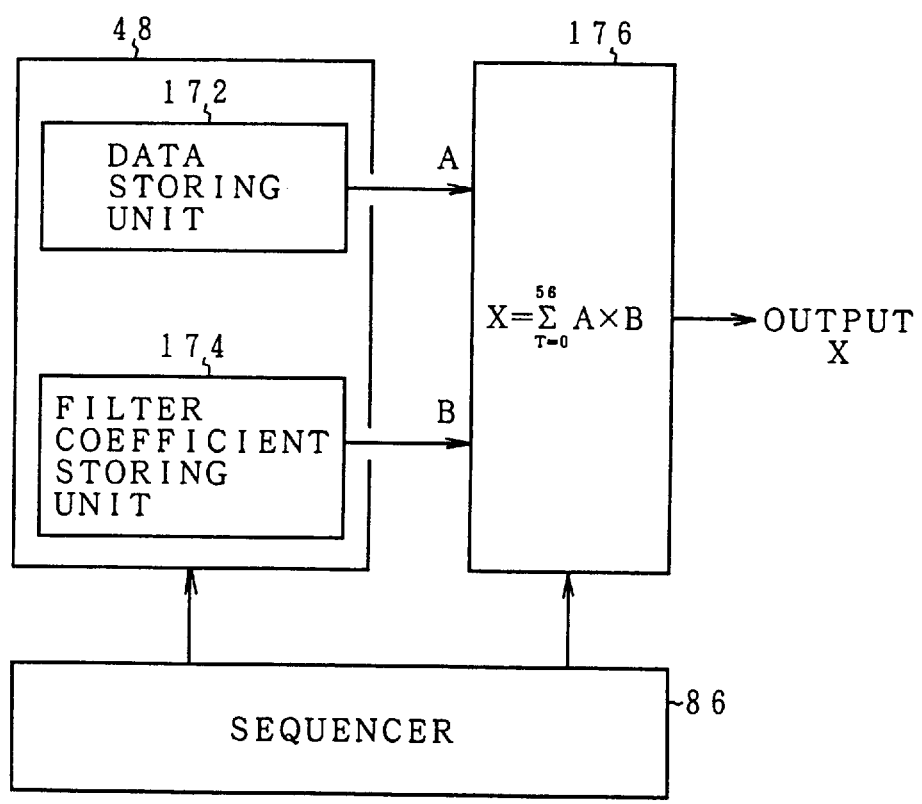

AUDIO DATA PROCESSING APPARATUS

BACKGROUND OF THE INVENTION

The invention relates to an audio data processing apparatus for inputting audio data from a digital sound source and performing necessary data processes and, after that, converting into an analog signal and outputting to a line. More particularly, the invention relates to an audio data processing apparatus for time-divisionally executing digital processes of multi-channels by using a logic circuit which is pipelined.

In recent years, in an apparatus called a multimedia apparatus such as a computer or the like, it is required that audio data from a plurality of different digital sound sources can be reproduced. It is necessary to mix the audio data from the plurality of digital sound sources and output the mixed data. In particular, as digital sound sources which are required for the computer, there are a plurality of digital sound sources designed by different flows and a data processing apparatus which can cope with all of the sound sources is requested. As mentioned above, since such various digital sound sources designed by different flows have been designed at individual sampling frequencies, it is necessary to prepare a digital/analog converter (DAC) corresponding to each sampling frequency. For example, a sound source apparatus (wave table synthesizer) called a PCM sound source (wave table sound source) has, for example, eight input channels and adds audio data of the same sampling period inputted to those input channels. In order to enable the apparatus to cope with such a PCM sound source, DACs corresponding to the sampling frequencies of 8 kHz, 16 kHz, 32 kHz, and 48 kHz are prepared and analog signals outputted from the DACs are mixed by using an analog device such as a transistor or the like. As another method, a DAC which can be switched to any one of the sampling frequencies of 8 kHz, 16 kHz, 32 kHz, and 48 kHz is prepared and a clock frequency for making the DAC operative in accordance with the sampling frequency is changed, thereby reconstructing various PCM processes. In a sound source apparatus called an FM sound source, information recorded by a combination of a sine wave signal is outputted in a form of a digital sound source of a sampling period of, for example, 55.5 kHz. Further, as a form similar to the PCM sound source, there is a digital audio sound source such as CD player or digital audio tape in which a continuous voice or music has been recorded by the PCM. In such a digital audio sound source, audio data of the sampling period specified by a standard such as 44.1 kHz is outputted.

In the sound source apparatus which is required for the personal computer as mentioned above, there are digital sound sources of various sampling periods and the DAC corresponding to each sound source has to be prepared. Further, in case of enabling those sound sources to be simultaneously outputted, analog audio data that is outputted from the DAC provided in correspondence to each sound source has to be mixed by using an analog device. Since the analog device which is difficult to form an integrated circuit has to be used for a digital device in which an integrated circuit technique is being improved more and more, consequently, when the apparatus is made correspond to various sound source apparatuses, an area on a printed circuit board that is occupied by a sound source circuit increases. As a method of providing those digital sound sources and reducing the sound source circuit, there is a method whereby what is called a digital selecting circuit such that a DAC which can cope with the sampling frequencies of those various digital sound sources is provided and the audio data of various digital sound sources is selectively inputted to the D/A converter is used, thereby making it possible to apparently cope with the sound sources. Such an apparatus which can selectively output the audio data, however, has a drawback such that a plurality of digital sound sources cannot be simultaneously reproduced. As a method of eliminating such a drawback that a plurality of digital sound sources cannot be reproduced and, further, reducing the sound source circuit, a method of realizing the foregoing mixing circuit by a digital circuit which can improve an integration density is considered.

In recent years, audio data from a plurality of different digital sound sources is used in a computer or the like and a data processing apparatus which can cope with processes such as interpolation, sound volume adjustment, filtering, mixing, and the like for various audio data as digital data as it is requested. In case of processing various audio signals as digital data as mentioned above, since the sampling frequencies of the sound sources differ when the sound sources are different, it is necessary to unite the sampling frequencies of the sound sources. Generally, since the sound source side doesn't have any means for changing the output sampling frequency, it is necessary to convert the sampling frequencies to the united sampling frequency such as 44.1 kHz, 48 kHz, or the like and to output by a digital audio processing apparatus provided on the computer side. Hitherto, in case of constructing an apparatus for processing audio signals as digital data, it is a general way to realize by a method of constructing by perfect logics or a software-like method using a digital signal processor (DSP).

FIG. 39 is a diagram showing an example of a conventional logic circuit which is used for digital processes of audio signals. In case of realizing such a circuit by a random logic, a desired process is realized by serially connecting selectors 301 and 302 and arithmetic operating units 303, 304, and 305 in accordance with a depth of arithmetic operation and a width of arithmetic operation data. Particularly, in case of mixing a plurality of audio data having different sound source sampling frequencies, an arithmetic operating process such as a filtering or the like at a high frequency that is common multiple times as high as the sound source sampling frequency is necessary. Therefore, a high speed or complicated arithmetic operating circuit is needed.

In the conventional apparatus of FIG. 1, however, since a desired audio process by serially connecting the selectors 301 and 302 and arithmetic operating units 303, 304, and 305 and sequentially performing arithmetic operations is realized, although a processing speed can be improved, there is a problem such that a gate scale enlarges. Particularly, like a digital filter of a finite impulse response type, in the case where a product sum operation has to be repeated many times, the problem of an increase in gate scale typically appears.

In case of realizing by a software of the digital signal processor, although a process of audio data having a high flexibility can be realized, a generality is also high. Therefore, in case of making the most of a desired performance, it is necessary to select or develop the digital signal processor according to such a requirement, resulting in an increase in costs. A processing speed is lower than that of the random logic.

SUMMARY OF THE INVENTION

According to the invention, an audio data processing apparatus using a logic in which a high speed process can be performed and which has an excellent generality and can realize a process of audio data is provided.

According to the invention, since audio data having different sound source sampling frequencies depending on sound sources is converted to a united sampling frequency of 44.1 kHz and is outputted, an audio data processing apparatus which is realized by a logic and a software which realize various interpolating processes is provided.

According to the invention, further, an audio data processing apparatus which is miniaturized to a size such that various digital sound source circuits and a circuit which can mix a plurality of digital sound sources can be built in one integrated circuit is provided.

The invention relates to an audio data processing apparatus for inputting one or a plurality of audio information and, thereafter, performing a data process and outputting the processed data. Namely, the audio data processing apparatus of the invention is characterized by comprising: a plurality of input channels for inputting audio data; and a data processing circuit to which a plurality of input channels are inputted and connected in parallel and which time-divisionally individually executes a data process necessary for each input channel at every period Tu that is decided by a standardized predetermined united sampling frequency 44.1 kHz and, thereafter, mixes the processed data and generates the resultant mixed data.

When the united sampling frequency 44.1 kHz and the sound source sampling frequency of the audio data differ, the data processing circuit executes a process to convert the audio data of the input channel into the sample data of the united sampling frequency 44.1 kHz That is, in the case where the sound source sampling frequency of the audio data differs from the united sampling frequency 44.1 kHz, the data processing circuit arithmetically operates interpolation data synchronously with the united sampling frequency and converts into the audio data of the united sampling frequency. The interpolating process is an arithmetic operation of the interpolation data based on a curve approximation and, specifically, the interpolation data is operated on the basis of the linear approximation.

For the arithmetic operation of the interpolation data based on the linear approximation, the data processing circuit comprises: a holding unit for holding at least three continuous sample data at every sound source sampling period; a time position operating unit which has a delay time during which an arithmetic operation can be performed and calculates an interpolation time position on the basis of at least the three continuous sample data held in the holding unit; and an interpolation operating unit for arithmetically operating interpolation data on the basis of the sample data held in the holding unit and the interpolation time position calculated by the time position operating unit. In such an arithmetic operation of the interpolation data, in order to enable the audio data which is generated from the sound source at a sound source sampling period Ts in a real-time manner to be processed in a real-time manner at an asynchronous timing corresponding to a united sampling period Tu, namely, the writing operation is performed at the sound source sampling period Ts and the reading operation is executed at the united sampling period Tu, so that at least three sample data holding units are necessary. In order to process the inputted audio data at a timing of the united sampling period Tu in a real-time manner, it is necessary to obtain the data that is a few periods before (before Nd periods or more) the present timing of the united sampling period Tu.

More specifically speaking, for the arithmetic operation of the interpolation data based on the linear approximation, the data processing circuit holds at least three continuous sample data S(n), S(n–1), and S(n–2) by the data holding unit at every sound source sampling period Ts of the input data. When "1" is added to the quotient obtained by dividing the sound source sampling period Ts by the united sampling period Tu and the resultant data reaches the united sampling period Tu, the number (Nd) of delay periods until the past period at which the interpolation data is calculated is set by a delay period number setting unit. Further, the counter is cleared each time a sampling clock is obtained, predetermined fundamental clocks are counted by a counter, and a count value cnt is outputted.

Further, each time the fundamental clock is obtained, a first time position operating unit subtracts the count value cnt and sampling period Tu from the value (Tu*Nd) obtained by multiplying the number (Nd) of delay periods to the united sampling period Tu, thereby calculating a first time position CT1 which is used for the arithmetic operation of the interpolation data. Namely, $$CT1=(Tu*Nd)-cnt-Tu$$

is calculated. At the same time, each time the fundamental clock is obtained, a second time position operating unit subtracts the count value cnt from the value obtained by multiplying the number (Nd) of delay periods to the united sampling period Tu, thereby calculating a second time position CT2 which is used for the arithmetic operation of the interpolation data. Namely, $$CT2=(Tu*Nd)-cnt$$

is calculated. When the interpolation data is calculated, a difference ΔT between the value (Tu*Nd) obtained by multiplying the number (Nd) of delay periods to the united sampling period Tu and the sound source sampling period Ts is compared with the count value cnt by a change-over selecting unit. Namely, $$\Delta T=(Tu*Nd)-Ts$$

is calculated and whether $$\Delta T \geq cnt \text{ or not}$$

is discriminated. When the count value cnt is equal to or less than the difference ΔT, the first time position CT1 is selected as an interpolation time position C. When the count value cnt exceeds the difference ΔT, the second time position CT2 is selected as an interpolation time position C. One-preceding data S(n–1) and two-preceding data S(n–2) are selected as new and old data A and B. When the count value cnt exceeds the difference ΔT, the second time position CT2 is selected as an interpolation time position C. The present data S(n) and one-preceding data S(n–1) are selected as new and old data A and B.

Each time the time reaches the united sampling period Tu, an interpolation operating unit arithmetically operates interpolation data X based on the linear approximation on the basis of the two new and old data A and B of the present data S(n) and one-preceding data S(n–1) held in the data holding unit and the interpolation time position C selected by the change-over selecting unit. That is, assuming that the two new and old data are set to A and B and the interpolation time position is set to C and the sound source sampling period Ts is set to D, the interpolation operating unit calculates the interpolation data X as $$X = A - (A-B)C/D$$

When this equation is specifically shown, it becomes as follows.

$$X = S(n-1) - \{S(n-1) - S(n-2)\}CT1/Ts$$

or $$X = S(n) - \{S(n) - S(n-1)\}CT2/Ts$$

The calculated interpolation data is the data that is preceding to the present time point by only the number (Nd) of delay periods. The above linear interpolating process is performed on the assumption that the sound source sampling period has previously been known and a ratio (Ts/Tu) between the sound source sampling period Ts and united sampling period Tu is equal to a value of non-integer times or 1/(a non-integer) as a prerequisite. In consideration of a change in interpolation timing at each united sampling period, the interpolation data can be properly calculated from the time position of the data interpolation in the sound source sampling period Ts and the sample data before and after the present data.

On the other hand, since there is also a case where the period of the sample data is not known, the data processing circuit measures the sound source sampling period Ts of the input data according to the invention. When the ratio (Ts/Tu) with the sound source sampling period Ts which was measured is equal to 1/integer, the data processing circuit 10 performs a thinning-out process to eliminate the data at every sound source sampling period existing for the interval of the united sampling period Tu. When the ratio (Ts/Tu) with the united sampling period Tu is equal to a value of an integer times, the data processing circuit executes what is called a zero setting interpolation to interpolate by inserting zero data to the positions of the united sampling periods Tu for the sound source sampling period Ts. Moreover, when the ratio (Ts/Tu) with the united sampling period Tu is equal to a value of non-integer times, the interpolation data by the linear approximation is inserted to the position of the united sampling period Tu for the sound source sampling period Ts, thereby linearly interpolating. The details of the linear approximation is as mentioned above.

As a sound volume adjusting process of the data processing circuit, a set sound volume coefficient is multiplied to the input data and the sound volume adjusted data is generated. The data processing circuit 10 can be also constructed in a manner such that after the input data was corrected to a specified level, the set sound volume coefficient is multiplied and the sound volume adjusted data is generated.

As a filtering process of the data processing circuit, a predetermined filter coefficient is multiplied to the input data and output data is arithmetically operated. As a specific filtering process of the data processing circuit 10, filter output data of target data is calculated by the sum of the products of the input data as many as a predetermined degree for every united sampling period existing on time bases before and after the target data as a center which is at present a processing target and the filter coefficients of a fixed degree according to a finite impulse response.

As a mixing process of the data processing circuit, a plurality of data selected as mixture targets are inputted and added.

In case of realizing the data processing circuit by logics, there are provided: a first processing circuit for time-divisionally executing the interpolation of the audio data as many as a plurality of channels, sound volume adjustment, and mixture output at every united sampling period Tu; and a second processing circuit for time-divisionally executing the filtering processes as many as a plurality of channels at every united sampling period Tu. Each of the first and second processing circuits has: a multiplication pipeline circuit for selecting two of a plurality of input data and, after that, multiplying; and an addition/subtraction pipeline circuit for selecting two of the plurality of input data and, after that, adding or subtracting. A data memory for reading out the input data and writing the output data is provided between the multiplication pipeline circuit and the addition/subtraction pipeline circuit. A control operation of each pipeline circuit is executed by using a control memory and a sequence counter of a sequencer. A control pattern for making the multiplication pipeline circuit and addition/subtraction pipeline circuit operative in the united sampling period Tu is stored in the control memory at every fundamental clock period. The sequence counter is cleared each time the period reaches the united sampling period Tu and repeats the counting operation of the fundamental clock at every united sampling period Tu and produces an access address in the control memory. The sequence counter reads out the operation pattern from the control memory and allows the multiplication pipeline circuit and addition/subtraction pipeline circuit to time-divisionally execute the processes as many as the plurality of channels. The multiplication pipeline circuit is constructed by: a first selector for selecting one of a plurality of input data; a second selector for selecting one of the plurality of input data; a first register for holding an output of the first selector; a second register for holding an output of the second selector; a multiplier for multiplying values of the first and second registers; and a first output register for holding an output of the multiplier. The addition/subtraction pipeline circuit is constructed by: a third selector for selecting one of a plurality of input data; a fourth selector for selecting one of the plurality of input data; a third register for holding an output of the first selector; a fourth register for holding an output of the second selector; an adder/subtracter for performing an addition or a subtraction to values of the third and fourth registers; a second output register for holding an output of the adder/subtracter; and a multiplexer for selecting the first or second output register. The outputs of the first and second output registers are fed back and connected to selector inputs as necessary. The first and second output registers have a function as a shift register. When an output operation is designated by the operation pattern, the output data of the adder/subtracter is held and, after that, the first and second output registers execute a shift-up or shift-down operation and can easily double the output data or reduce the output data into ½.

The addition/subtraction pipeline circuit of the second processing circuit for performing the filtering process is characterized in that the output of the adder/subtracter is directly fed back and connected to the selector input side. A masking circuit for masking a part of the feedback data is provided for a feedback connecting circuit to the input side of the first and second output registers.

A plurality of input channel circuits respectively input and connect: an output of a PCM sound source module known as a wave table sound source; an output of an FM sound source module; an output of a microphone input circuit having an amplifier and an A/D converter; an output of a CD apparatus that is externally connected; a digital output of an audio apparatus that is externally connected; and transfer data of an external memory device which is externally connected through a data bus.

The data processing circuit realized by the logics as mentioned above can execute a pipeline arithmetic operation of the multiplication and subtraction, so that an operating speed is remarkably raised. For example, with respect to the repetition of the product sum calculations of the filtering process, the present multiplication and the addition of the preceding multiplication result can be calculated in parallel by the pipeline process while looping. The interpolating process is executed by the subtraction, multiplication, and subtraction. The sound volume adjustment is performed by the multiplication twice. Further, the mixer output is obtained by the addition of a plurality of number of times. By properly combining the pipeline arithmetic operations of the multiplication and subtraction, the processes as many as multi-channels are efficiently operated at every united sampling period. The digital audio data of different sound source sampling frequencies can be united to the united frequency 44.1 kHz. Further, with respect to the filtering process of a large calculation amount, for the first processing circuit to perform the interpolation, sound volume adjustment, and mixer output, another hardware construction is provided as a second processing circuit. Therefore, even if an arithmetic operation element of a relatively low speed (low electric current consumption and low costs) is used, the processes can be sufficiently executed.

The above and other objects, features, and advantages of the present invention will become more apparent from the following detailed description with reference to the drawings.

BRIEF DESCRIPTION OF THE DRAWINGS

FIG. 5 is a circuit block diagram of a first processing circuit in FIG. 4;

FIG. 9 is an explanatory diagram of the operation and the number of necessary states in a circuit block in FIG. 5;

FIG. 17 is an operation explanatory diagram of the circuit in FIG. 5 to realize a function of a sound volume adjusting unit in FIG. 16;

FIG. 18 is a functional block diagram of a filtering process provided for the second processing circuit in FIG. 4;

DETAILED DESCRIPTION OF THE PREFERRED EMBODIMENTS

[Construction and functions of apparatus]

Figure 1:
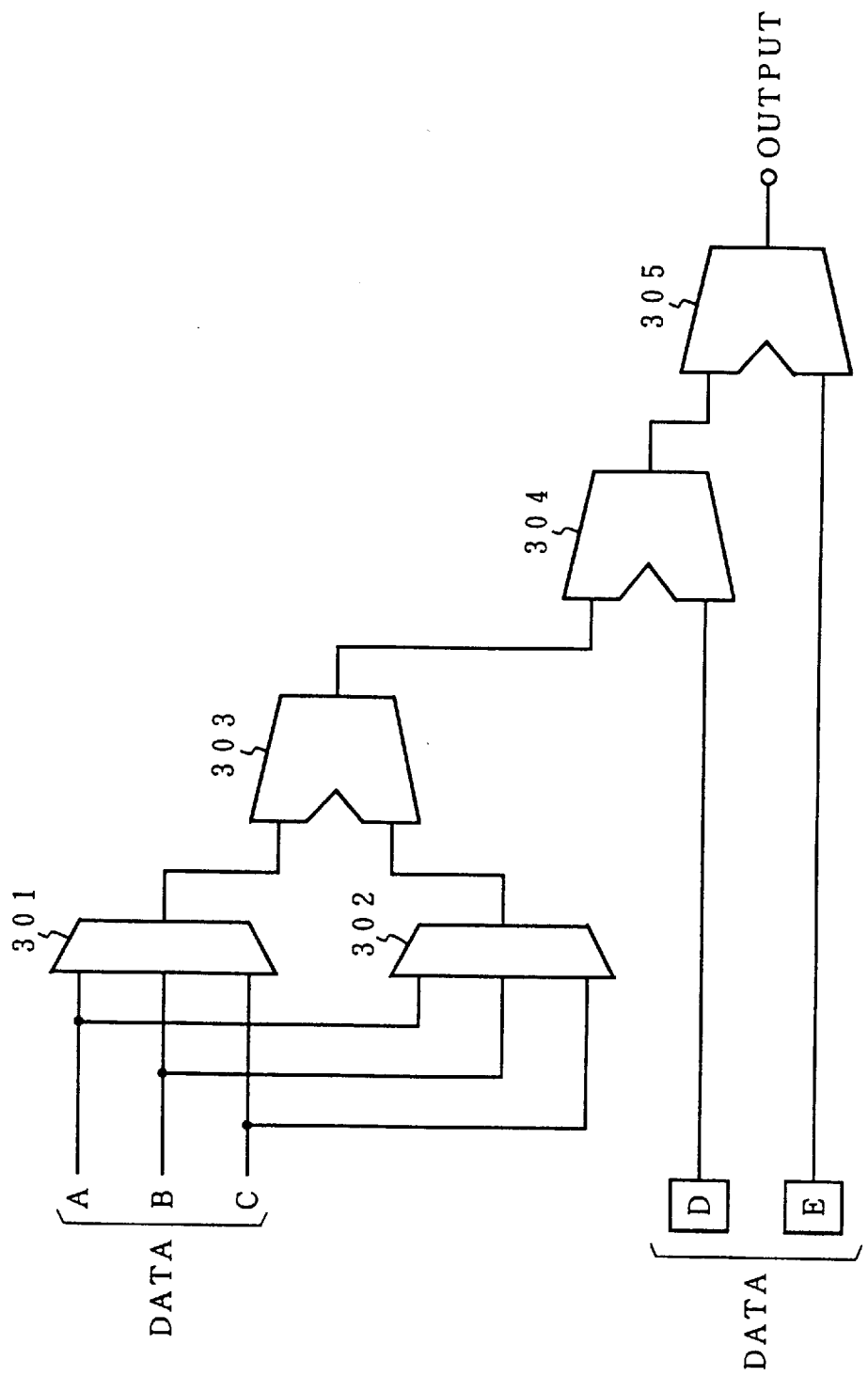
FIG. 1 is a circuit block diagram of a conventional apparatus realized by random logics.
Figure 2:
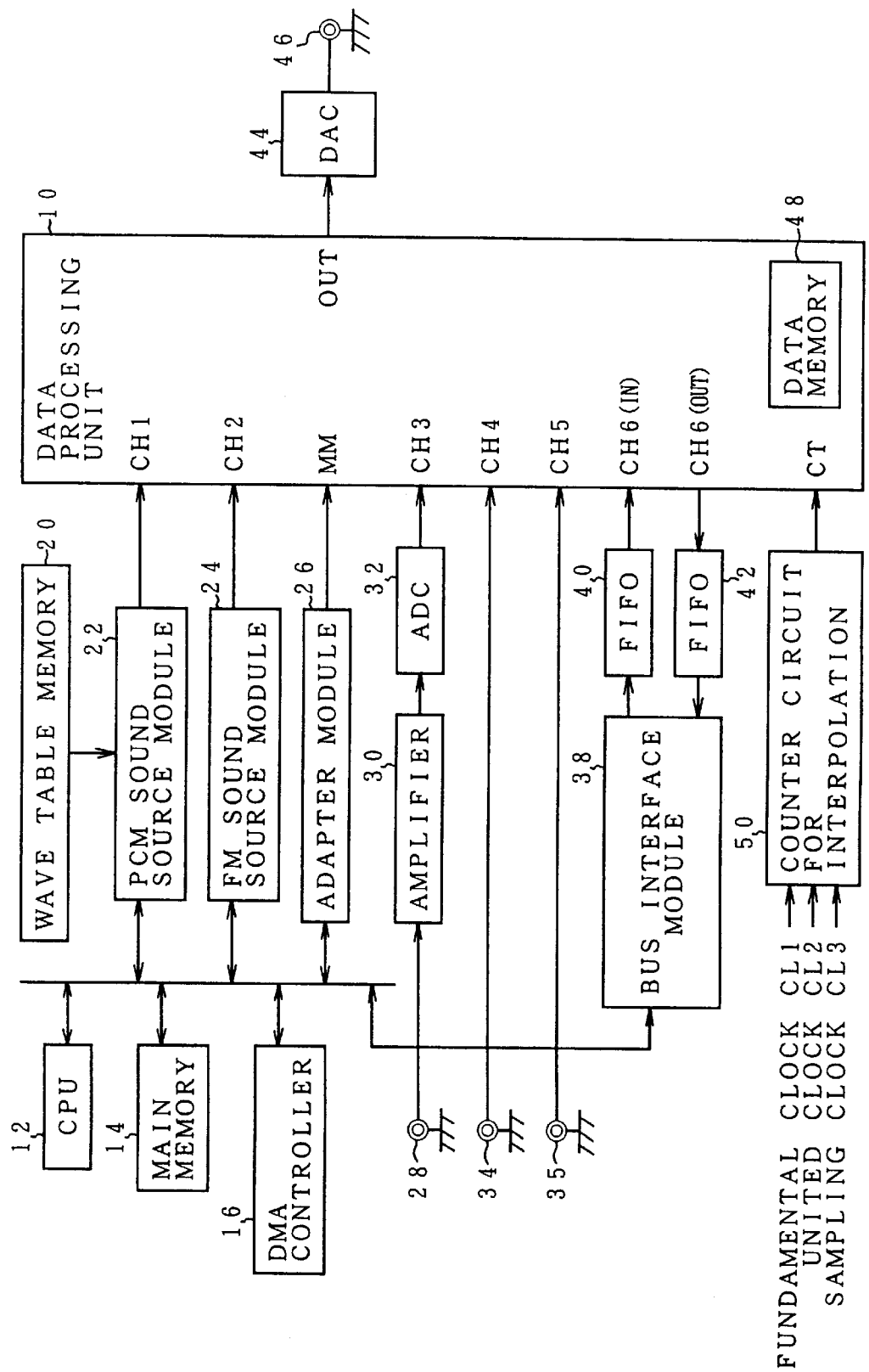
FIG. 2 is a block diagram showing an embodiment of the invention.

FIG. 2 is a whole block construction of an audio data processing apparatus of the invention. In FIG. 2, a data processing unit 10 has a plurality of channel inputs CH1 to CH6 and processes digital audio data which is inputted from the channels CH1 to CH6 as a united sampling frequency 44.1 kHz. Sound source sampling frequencies of the digital audio data which is inputted to the data processing unit 10 are various depending on sound sources. Digital audio data of a sound source sampling frequency lower than the united sampling frequency 44.1 kHz is converted into digital audio data of the united sampling frequency 44.1 kHz by an interpolating process and is subjected to necessary processes such as sound volume adjustment, filtering, mixing, and the like. Digital audio data having a sound source sampling frequency higher than the united sampling frequency 44.1 kHz is converted into digital audio data of the united sampling frequency 44.1 kHz by a thin-out process. A PCM sound source module 22 is connected as an input channel CH1 for the data processing unit 10. The PCM sound source module 22 which uses a wave table memory 20 and can simultaneously generate a plurality of channels generates sound sources in accordance with an instruction of a CPU 12. An FM sound source module 24 is connected to the input channel CH2 of the data processing unit 10. On the basis of a control by the CPU 12, the FM sound source module 24 performs a sound source output for simultaneously generating a plurality of channels by an FM method in which effective sounds and musical instrument sounds are simulated. An audio signal from a microphone input terminal 28 is amplified by an amplifier 30 and, after that, the amplified signal is converted into serial digital audio data by an A/D converter 32. The digital audio data is supplied to the input channel CH3 of the data processing unit 10. A CD serial data input terminal 34 is connected to the input channel CH4 of the data processing unit 10 and a digital audio signal reproduced by the CD apparatus by an optical disk driving is inputted. A sound source sampling frequency of the digital audio signal to the CD serial data input terminal 34 is equal to 44.1 kHz. By providing an ADPCM decoder at the front stage, an audio signal of 18.9 kHz or 37.8 kHz which is outputted from a CD-ROM-XA can be also inputted. An AUX input terminal 35 is connected to the input channel CH5 of the data processing unit 10. A digital audio signal or the like of a video, CD, or the like is inputted from the AUX connecting terminal 35. The channel CH6 of the data processing unit 10 has a channel for input and a channel for output. The input channel (IN) and output channel (OUT) are respectively connected to a bus interface module 38 through FIFOs 40 and 42. The bus I/F module 38 is connected to a bus 18. The bus 18 is connected to a main memory 14 and a DMA controller 16 and performs a data transfer of the digital audio data to/from the main memory 14 by the control of the DMA controller 16. A sound source sampling frequency of the audio data that is transferred by the bus 18 lies within a range from 8 to 48 kHz and is set to either one of stereophonic signals or a monaural signal. The output side of the channel CH6 is used for outputting the digital audio signal inputted from the channels CH1 to CH5 or the mixture result of a plurality of inputted digital audio signals to an external memory and storing into a file or the like. The digital audio data of the data processing unit 10 has a data width of, for example, 16 bits and is serially converted at every united sampling period Tu according to the united sampling frequency 44.1 kHz and is supplied to a D/A converter 44 and is converted into the analog audio signal. The analog audio signal is outputted from an L/R output terminal 46 via a line. Even if the sound source sampling frequencies of the input channels CH1 to CH6 are frequencies other than the united sampling frequency 44.1 kHz, all of the digital audio signals which are outputted from the L/R output terminal 46 are converted to the united sampling frequency of 44.1 kHz by the processes by the data processing unit 10 and, after that, the digital audio signals are converted to the analog audio signals by the D/A converter 44. A data memory 48 in which various parameters which are necessary for processes such as interpolation, sound volume adjustment, filtering, mixing, and the like of the digital audio data from the input channels CH1 to CH6 have previously been stored is provided in the data processing unit 10. The data memory 48 is also used as a data buffer for temporarily storing the data in the middle of the process and for handing over to the next process. Further, a counter circuit 50 for interpolation is provided for the data processing unit 10. A fundamental clock CL1, a united clock CL2, and a sampling clock CL3 corresponding to the sound source sampling frequency as a target of the interpolation are supplied to the counter circuit 50 for interpolation. A frequency of the fundamental clock CL1 is set to, for example, 16.9344 MHz. When a clock period of the united clock CL2 of the united sampling frequency 44.1 kHz, namely, the united sampling period Tu is expressed by the number of fundamental clocks CL1, Tu=384 clocks. Although the sampling clock CL3 is determined in correspondence to the sound source sampling frequency of proper input audio data, an example in the case where the sound source sampling frequency is set to 16 kHz is shown in the embodiment. The clock period of the sampling clock CL3 of the sound source sampling frequency 16 kHz, namely, a sound source sampling period Ts is expressed by the number of fundamental clocks CL1, Ts = 1058.4 clocks. Each time the sampling clock CL3 is obtained, the counter circuit 50 for interpolation clears a counter provided therein. For a period of time until the sampling clock CL3 is subsequently obtained, the fundamental clock CL1 is counted and a count value cnt is obtained. On the basis of the count value cnt, a time position CT of the interpolation data which is used for interpolation calculation is supplied to the data processing unit 10. The details of the counter circuit 50 for interpolation will be clarified hereinlater in the description of the interpolating process.

Figure 3:
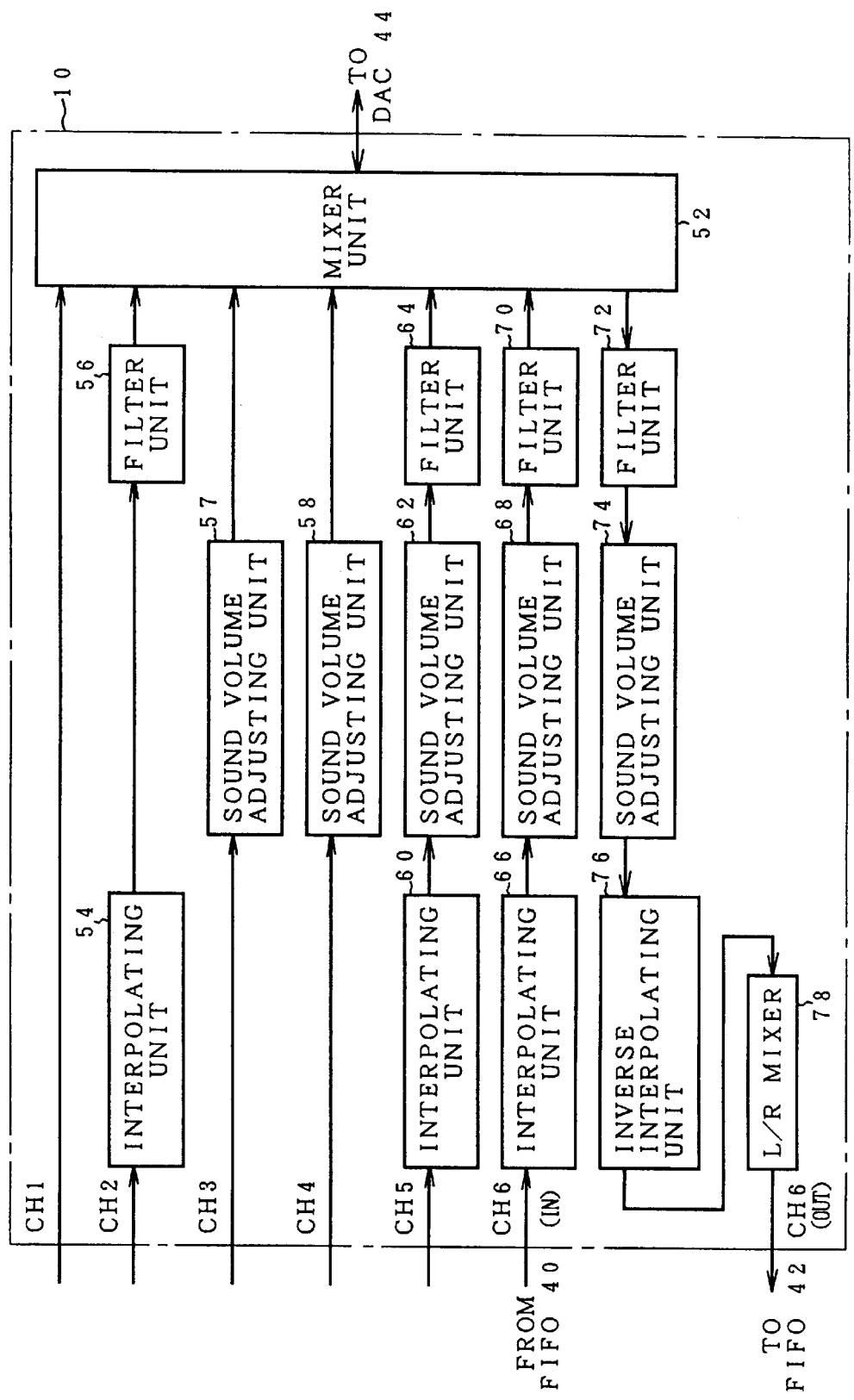
FIG. 3 is a functional block diagram of a data processing circuit in FIG. 2.

FIG. 3 shows a functional block diagram of processing functions of digital audio data which are realized by the data processing unit 10 for the channels CH1 to CH6 in FIG. 2. First, with respect to the input channel CH1 of the PCM sound source module 22, the case where all of the necessary processes have already been finished on the PCM sound source module 22 side and the sound source sampling frequency of the PCM sound source module 22 is set to the united sampling frequency 44.1 kHz has been shown as an example. Therefore, it is inputted as it is to a mixer unit 52. With regard to the input channel CH2 of the FM sound source module 24, since the sound source sampling frequency is not set to the united sampling frequency 44.1 kHz, it is interpolated by an interpolating unit 54 and is converted into data of the sampling period of 44.1 kHz. After that, a low pass filtering process to eliminate high frequency noises is performed by a filter unit 56 and the resultant data is supplied to the mixer unit 52. As for the input channels CH3 and CH4 as a microphone input and a CD serial data input, since the sound source sampling frequencies are set to 44.1 kHz, the interpolating process is not performed but a sound volume adjustment is executed by sound volume adjusting units 57 and 58. After that, the adjusted data is inputted to the mixer unit 52. In case of the channel CH5 to input the video digital audio data from the AUX input terminal, for example, since the sound source sampling frequency is set to 16 kHz, it is interpolated to 44.1 kHz by an interpolating unit 60. After that, the sound volume is adjusted by a sound volume adjusting unit 62 and is further subjected to a low pass filtering process to eliminate high frequency noises occurring by the interpolation by a filter unit 64. After that, the resultant data is outputted to the mixer unit 52. Further, as for the digital audio data from the data bus serving as an input of the channel CH6, it is read out from the FIFO 40 by, for example, a sound source sampling frequency 8 kHz and is interpolated to 44.1 kHz by an interpolating unit 66. After that, it is subjected to a sound volume adjustment by a sound volume adjusting unit 68 and a low pass filtering process by a filter unit 70. The resultant data is supplied to the mixer unit 52. Further, with regard to the output side of the channel CH6, the digital audio data of the united sampling frequency 44.1 kHz derived through the mixer unit 52 is returned to the original data by a filter unit 72. After that, the sound volume is adjusted by a sound volume adjusting unit 74. Further, the data is returned to the original sample data of 8 kHz by a thin-out process or the like by an inverse interpolating unit 76 and is finally mixed by an L/R mixer 78. The resultant data is supplied to the FIFO 42 for output. As mentioned above, the data processing unit 10 executes processes of the unique digital audio data with respect to each of the input channels CH1 to CH6 and finally performs the designated mixture by the mixer unit 52 and supplies the result as serial digital audio data to the D/A converter 44. In the embodiment, exclusive-use processing circuits are separately provided for those multi-channel inputs with respect to two systems such as system for the interpolating process, sound volume adjusting process, and mixing process and system for the filtering process. Each of the processing circuits is time-divisionally multiple-processed at every united sampling period Tu of the united sampling frequency 44.1 kHz.

[Logic construction and control of data processing circuit]

Figure 4:
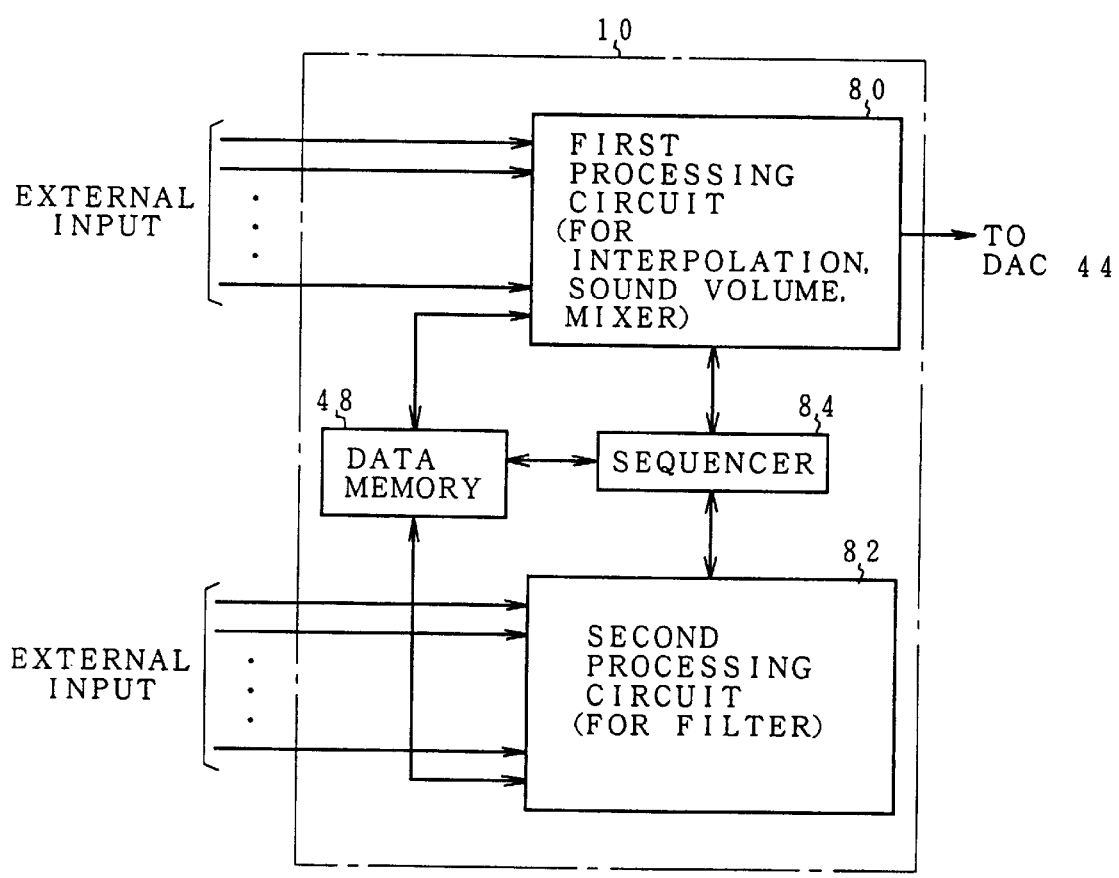
FIG. 4 is a block diagram of the data processing circuit in FIG. 2.

FIG. 4 is a diagram showing a fundamental construction of an internal circuit of the data processing unit 10 in FIG. 2. The data processing unit 10 comprises: a first processing circuit 80 for performing processes such as interpolation, sound volume adjustment, and mixing to digital audio data, as targets, of multi-channels which is inputted from the outside; and a second processing circuit 82 for likewise performing a filtering process to digital audio data, as targets, serving as external inputs of multi-channels. A sequencer 84 is provided in order to execute once the processes for the interpolation, sound volume adjustment, and mixing as many as the multi-channels to the first processing circuit 80 for the united sampling period Tu and to execute the necessary filtering arithmetic operation to the second processing circuit 82 for the same period Tu. The data memory 48 is commonly used by the first and second processing circuits 80 and 82. In response to an access request by the sequencer 84, the reading and writing operations of the necessary data are executed for the first and second processing circuits 80 and 82. An output to the external D/A converter 44 is an output from the first processing circuit 80 side because the mixing process of the first processing circuit 80 is finally executed.

FIG. 5 is a diagram showing an embodiment of the first processing circuit 80 provided for the data processing unit 10 in FIG. 4. The first processing circuit 80 is constructed by an upper multiplication pipeline circuit 80-1 and a lower addition/subtraction pipeline circuit 80-2. The multiplication pipeline circuit 80-1 has selectors 88 and 90 for individually selecting external inputs of two systems and registers 92 and 94 are subsequently provided. After the registers 92 and 94, a multiplier 96 is provided and two register inputs are multiplied. An output register 98 is provided after the multiplier 96. The addition/subtraction pipeline circuit 80-2 is constructed by: selectors 100 and 102 for individually selecting external inputs of two systems; registers 104 and 106 for holding two selector outputs; an adder/subtracter 108 for performing an addition or a subtraction to two register inputs; and further a register 110 with a shifting function. Subsequent to the register 110 with the shifting function, a multiplexer 112 for selecting outputs of the multiplication pipeline circuit 80-1 and addition/subtraction pipeline circuit 80-2 is provided. After the register 110 with the shifting function, a register 113 with a shifting function is further provided. After the final output was held, the register 113 executes a shifting operation and outputs the shifted data as serial data to the external D/A converter 44. An output of the output register 98 is fed back to the selector 90 of the multiplication pipeline circuit 80-1. An output of the register 92 is fed back to the selector 88. By such a feedback of the register output at a proper stage to the input selector as mentioned above, a loop process such that the input result can be again inputted or the arithmetic operation result is again inputted can be performed. An output of the output register 98 of the multiplication pipeline circuit 80-1 is also inputted to the selector 100 of the addition/subtraction pipeline circuit 80-2. A multiplication result of the multiplication pipeline circuit 80-1 is inputted to the addition/subtraction pipeline circuit 80-2 and the addition or subtraction can be performed subsequent to the multiplication. In the addition/subtraction pipeline circuit 80-2, further, in addition to the feedback of an output of the register 110 with the output function at the final stage to the selector 102, an output of the adder/subtracter 108 is directly fed back to the selector 102. Thus, the arithmetic operation result by the adder/subtracter 108 can be immediately looped to the next addition or subtraction. Such a direct feedback connection to the selector 102 from the adder/subtracter 108 is used in a filtering process, which will be clearly explained hereinlater. An AND gate 114 for masking is further provided for the addition/subtraction pipeline circuit 80-2. The data of the register 110 with the shifting function is inputted to one input of the AND gate 114 and proper mask data is inputted to the other input, thereby enabling a part of the output data which is fed back to the selector 102 to be masked.

The sequencer 84 is provided for the multiplication pipeline circuit 80-1 and addition/subtraction pipeline circuit 80-2 in order to realize various kinds of processes as shown in, for example, FIG. 3 with respect to the digital audio data of all of the channel inputs at the united sampling period Tu of the united clock frequency 44.1 kHz. A sequence counter 116 is provided for the sequencer 84. Each time the united sampling clock CL2 is obtained, the sequence counter 116 is cleared. For a period of time until the next united sampling clock CL2 is obtained, the sequence counter 116 counts the fundamental clock CL1. For example, since 16.9344 MHz is used as a fundamental clock CL1, the period Tu of the united sampling clock CL2 can be expressed by Tu=384 clocks. A control memory 118 using a non-volatile memory such as a flash memory or the like is provided for the sequence counter 116. The control memory 118 has control addresses 0 to 383 corresponding to the period Tu=384 of the united sampling clock CL2. In order to realize the processes for the interpolation, sound volume adjustment, and mixing of the digital audio data, for example, bit correspondence control information for making each of the circuit units of the multiplication pipeline circuit 80-1 and/or the addition/subtraction pipeline circuit 80-2 operative has been stored in each control address of the control memory 118. In the access by the address designation of the control memory 118 by count values of 0 to 383 of the sequence counter 116, the addresses 0 to 383 can be directly designated or a relative address which changes within a relative range of the count values 0 to 383 converted into a predetermined memory area can be also used. Control data which is read out every counting operation of the sequence counter 116 from the control memory 118 is supplied to a control output register 120. The control output register 120 is allowed to perform the operation based on bit data in a bit area corresponding to each circuit element of the multiplication pipeline circuit 80-1 and addition/subtraction pipeline circuit 80-2. For example, with respect to the registers 92, 94, 98, 104, and 106, since each of them is set to either one of the holding state or the non-holding state, it is sufficient to use one bit as control information of the control output register. Since each of the selectors 88, 90, 100, and 102 needs the selections as many as the number of inputs, it is sufficient to set the number of bits of the binary notation of the number of inputs to the control bits. Since the multiplier 96 is set to either one of the present state and absent state of the multiplication, it is sufficient to use one bit. If the multiplier 96 is always operating, the bit control is unnecessary. As for the adder/subtracter 108, one control bit is needed for selection between the addition and the subtraction. The register 110 with the shifting function needs total three bits of one bit for control of the holding operation, one bit for the shift-up function, and further one bit for the shift-down function. The multiplexer 112 can be switched by one bit. Therefore, a control output register 120 has a width corresponding to the total number of bits of necessary control patterns, for example, a width of 64 bits. Further, access information of the reading and writing operations for the data memory 48 has been stored in the control memory 118. By the address designation by the count value of the sequence counter 116, simultaneously with the output of the control data to the control output register 120, memory access data is outputted to a memory access register 122. The necessary read or write address of the data for the multiplication pipeline circuit 80-1 and addition/subtraction pipeline circuit 80-2 is designated in the memory access register 122 by the operation of the count value at that time of the sequence counter 116.

Figure 6:
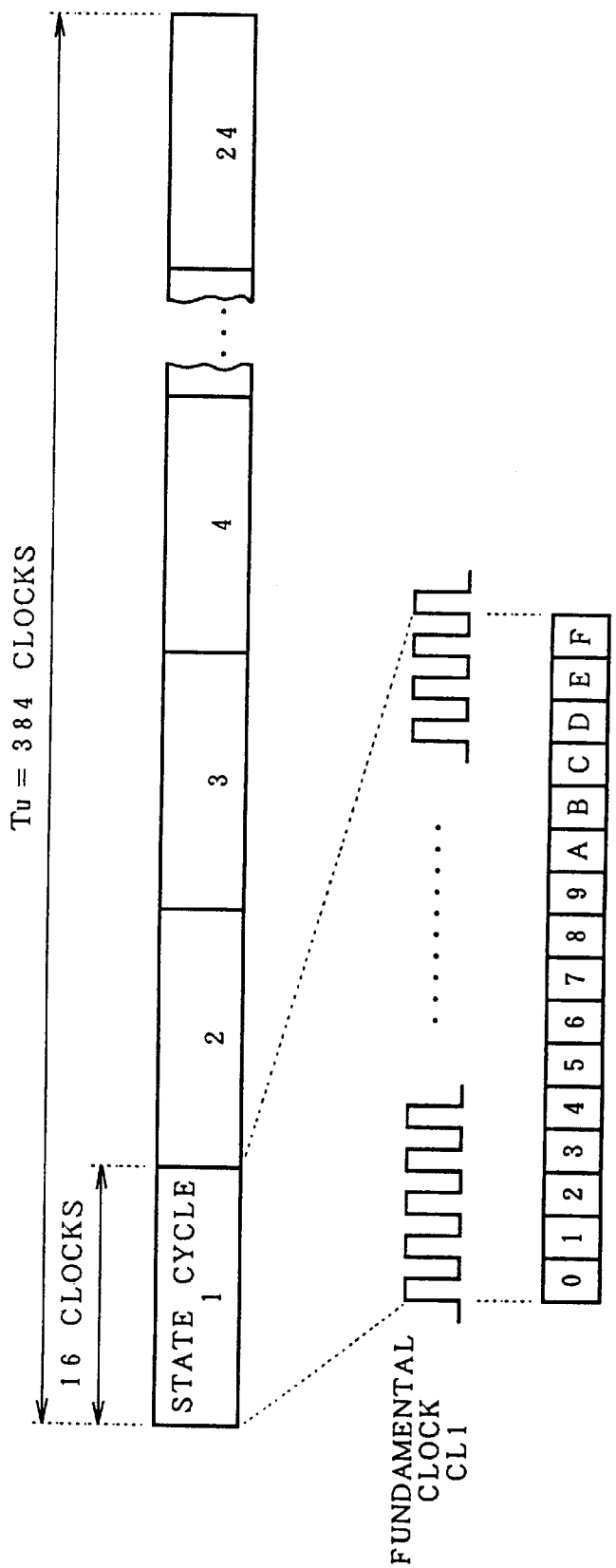
FIG. 6 is an explanatory diagram of a state cycle of a united sampling period by a sequencer in FIG. 5.

FIG. 6 is a diagram showing one processing cycle of the united sampling period Tu (=384 clocks) by the sequence counter 116 in FIG. 5. In the time zone of the united sampling period Tu (=384 clocks) which is determined by the sampling frequency of 44.1 kHz, for example, one state cycle is constructed by 16 clocks of the fundamental clock CL1. Since Tu=384 clocks, such a time zone can be divided into state cycles 1 to 24. One state cycle is divided into 16 states in correspondence to one clock of the fundamental clock CL1 as typically shown in the state cycle 1 State numbers of those 16 states are set to 0 to F as numbers. The processes of 384 clocks which are determined by the united sampling period Tu are classified into the state cycles 1 to 24 of 16 states, so that the control data to execute the data processes that are required for, for example, the six channel inputs CHI to CH6 in FIG. 3 in the united sampling period Tu (=384 clocks) can be easily allocated. The state and state cycles in FIG. 6 are not particularly aware in the actual access by the sequence counter 116 by the control memory 118. In the control memory 118, only the processes such that the access address that is decided by the count value in a range from 0 to 383 which is outputted by the sequence counter 116 is recognized and the control data in the designated access address is read out and set into the control output register 120 are merely performed.

Figure 7:
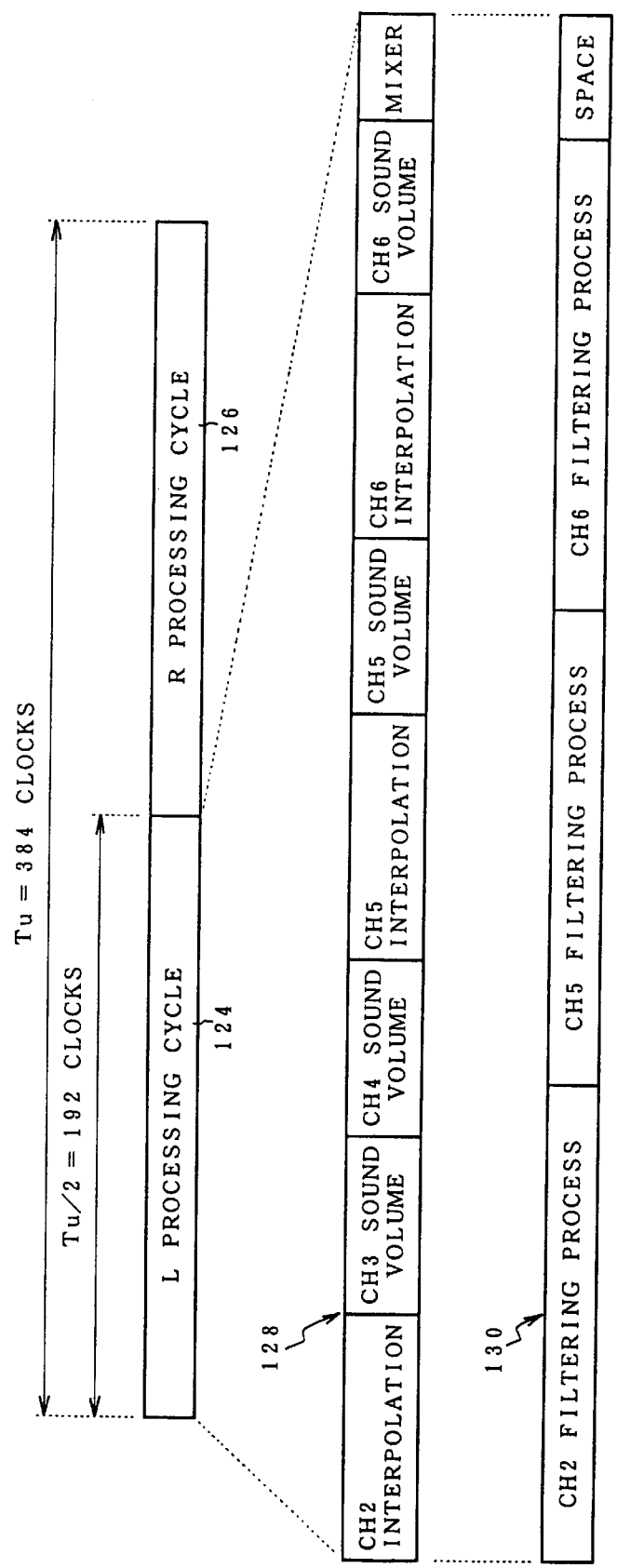
FIG. 7 is an explanatory diagram of time-divisional processes at a united sampling period of first and second processing circuits in FIG. 5.

FIG. 7 shows the contents of one process at the united sampling period Tu (=384 clocks) of the first and second processing circuits 80 and 82 by the sequence counters 84 and 86 in the data processing unit 10 in FIG. 4. First, a processing period of Tu (=384 clocks) is constructed by an L processing cycle 124 of 192 clocks of the former half and an R processing cycle 126 of, likewise, 192 clocks of the latter half. The processing contents of the stereophonic digital audio data of L and R are exactly identical. Therefore, the control contents in the control memory 118 of the former half L processing cycle 124 and the latter half R processing cycle 126 are fundamentally identical except that the selection of the inputs and the reading/writing operation of the control memory 48 are merely different. Therefore, in the sequence counter 116 in FIG. 5, actually, processes such that after the count value is cleared by the united clock CL2, 192 fundamental clocks CL1 are counted are repeated twice and the L processing cycle 124 and R processing cycle 126 in FIG. 7 are executed. As extracted and shown on the lower side, the L processing cycle 124 in FIG. 7 is constructed by parallel processes of a data process 128 by the first processing circuit 80 in FIG. 4 and a data process 130 by the second processing circuit 82. The data process 128 by the first processing circuit 80 is executed in accordance with the order of, for example, the interpolating process of the channel CH2, the sound volume adjusting process of the channel CH3, the sound volume adjusting process of the channel CH4, the interpolating process of the channel CH5, the sound volume adjusting process of the channel CH5, the interpolating process of the channel CH6, the sound volume adjusting process of the channel CH6, and the final mixing process. The data process 130 by the second processing circuit 82 is executed in accordance with the order of the filtering process of the channel CH2, the filtering process of the channel CH5, and the filtering process of the channel CH6. The parallel processes of the data processes 128 and 130 as mentioned above are also similarly executed for the R processing cycle 126. With respect to the processes for the interpolation, sound volume adjustment, and mixing of the data process 128, the processes of five channels CH2 to CH6 can be sufficiently time-divisionally processed for a period of time of 192 clocks. On the other hand, since the filtering process of the data process 130 is the digital filtering process of the finite impulse response type, a finite number of filter coefficients for setting effects and a precision of the filter to necessary and enough effects and precision are developed on a time base, so that a time that is required for one filtering process is longer than that of the processes for the interpolation, sound volume adjustment, and mixing. Therefore, the second processing circuit 82 is allocated only for the filtering process. In the filtering process 128 in FIG. 7, processing areas for the interpolation, sound volume adjustment, and mixing are separated every channel. However, since the processing result can be read out and written from/to the data memory 48 at the middle stage of the process, it is also possible to execute processes in which the interpolating process, sound volume adjusting process, and mixing process are mixed on a state cycle unit basis. Further, with respect to either one of the data processes 128 and 130, all of the states of 192 clocks don't always need to be completely used. It is sufficient to make the control memory 118 operative so that the processes are executed in 192 clocks within a range of the requested channel input number.

Figure 8:
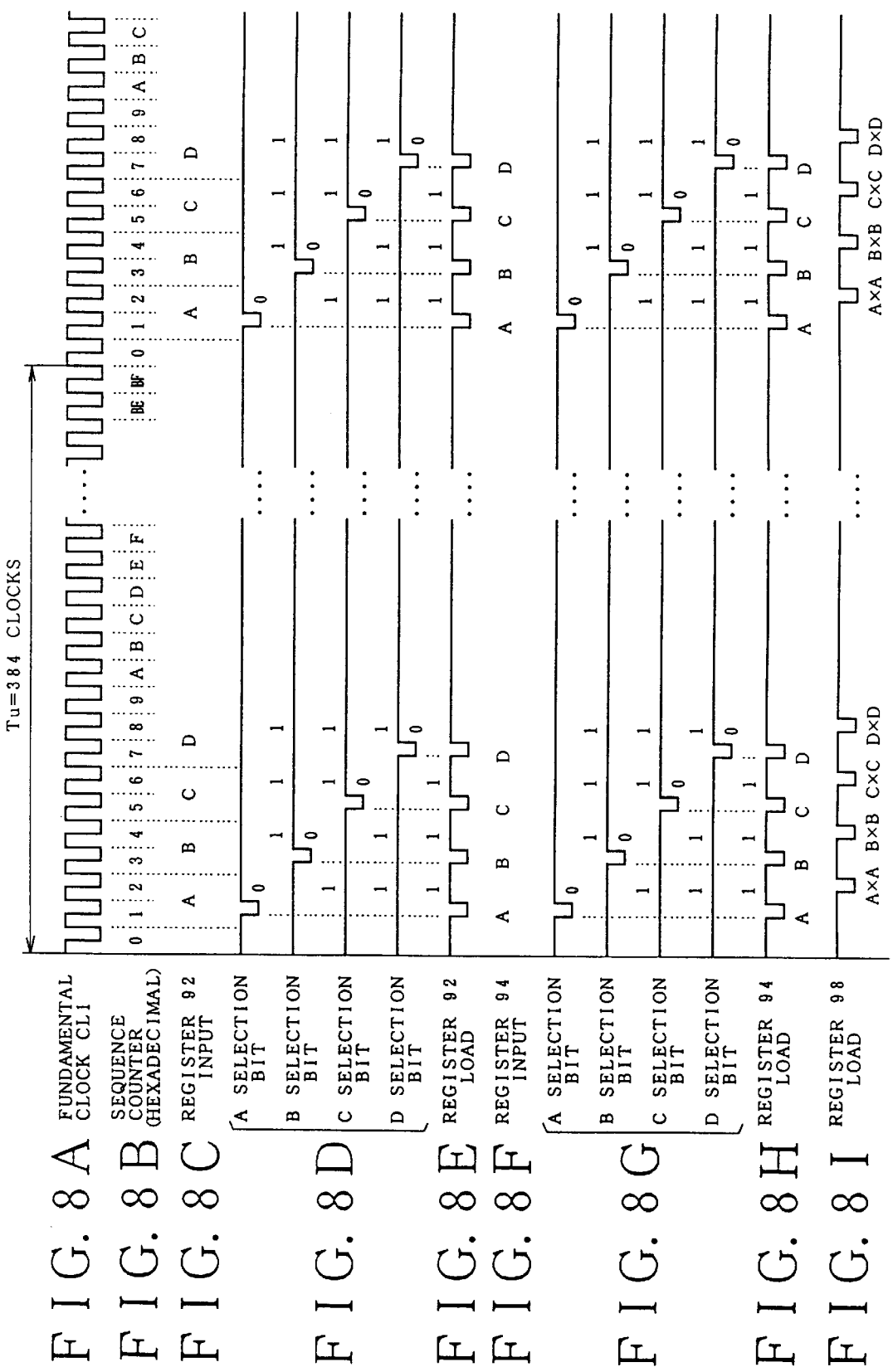
FIGS. 8A to 8I are timing charts for the fundamental operation on a multiplication pipeline circuit side in FIG. 5.

FIGS. 8A to 8I are timing charts for the fundamental operation of the multiplication pipeline circuit 80-1 in FIG. 5. The timing charts are shown with respect to an example of processes such that the same input data A is selected by the selectors 88 and 90 and stored into the registers 92 and 94 and, after that, the outputs of those registers are multiplied by the multiplier 96 and the multiplication result is stored into the output register 98. That is, in response to the reference clock CL1 in FIG. 8A having the united clock period Tu (=384 clocks), the value of the sequence counter 116 in FIG. 8B changes in a range from 0 to BF as hexadecimal numbers. FIGS. 8C, 8E, 8F, 8H, and 8I show an input and loading for the register 92, an input and loading for the register 94, and further a loading for the register 98. The registers 92, 94, and 98 operate in response to the trailing edge of the fundamental clock CL1. FIG. 8D shows selection bits of input data A, B, C, and D of the selector 88 as inputs to the register 92. The selection bits are sequentially selected in accordance with the order by the count values 1, 3, 5, and 7 of the sequence counter and are loaded into the register 92 as shown in FIG. 8E. As shown in FIGS. 8F, 8G, and 8H, the register 94 side also similarly operates with respect to the same input data A, B, C, and D. As shown in FIG. 8I, values (A×A), (B×B), (C×C), and (D×D) which were multiplied by the multiplier 96 are sequentially loaded into the output register 98 at the timings of the count values 1, 3, 5, and 7 of the sequence counter.

FIG. 9 shows the control contents in the multiplication pipeline circuit 80-1 and addition/subtraction pipeline circuit 80-2 in FIG. 5 and the number of necessary states, namely, the number of fundamental clocks. With regard to any one of a selection latch, a multiplication latch, an addition/subtraction latch, a memory read, a memory write, an output latch, and an output selection, it can be processed by one state.

[Interpolating process]

Figure 10:
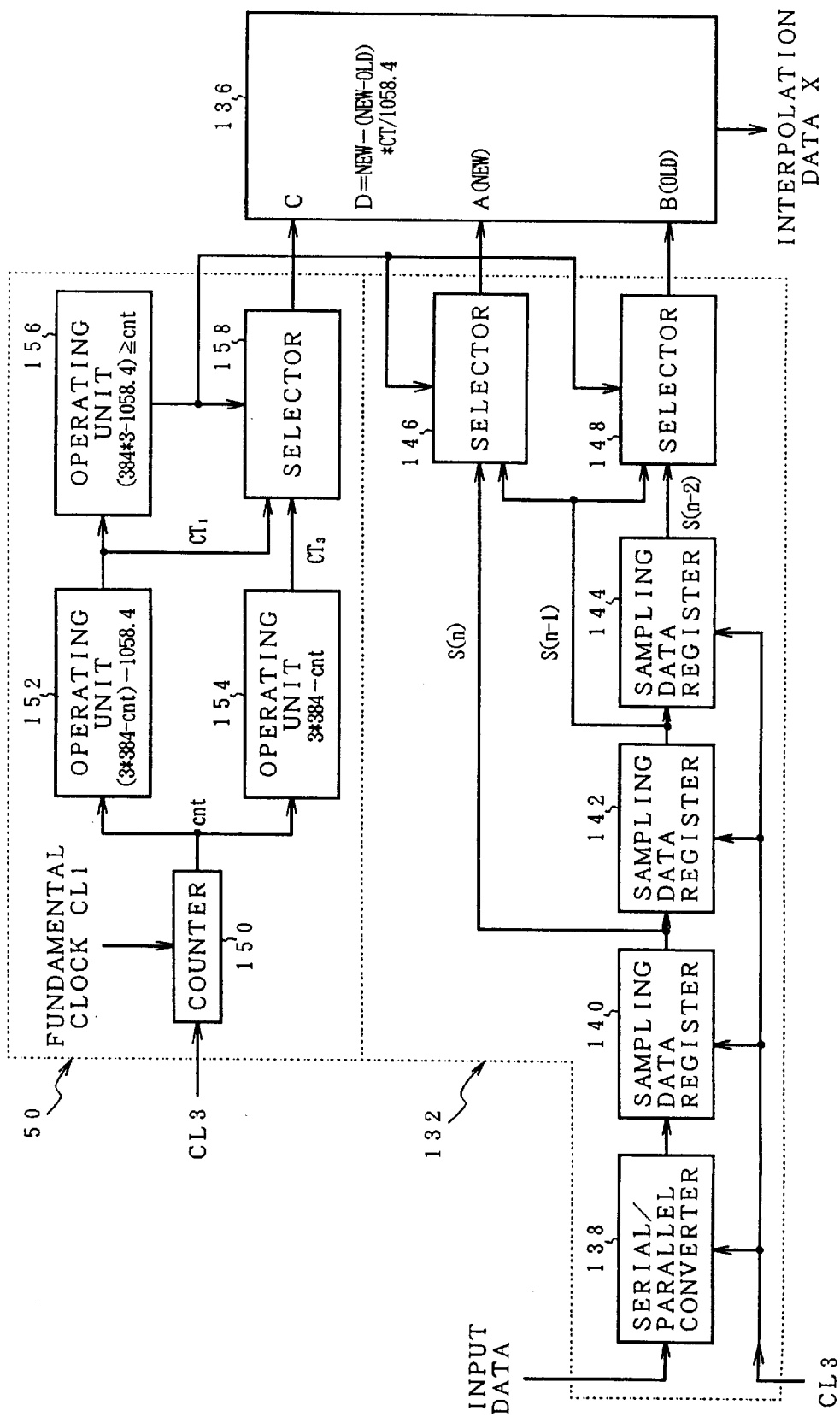
FIG. 10 is a functional block diagram of an interpolating process provided for the first processing circuit in FIG. 5.

FIG. 10 is a functional block diagram of the interpolating process of the digital audio data which is executed by the data processing unit 10 in FIG. 2. The interpolation processing unit is constructed by a data holding unit 132, the counter circuit 50 for interpolation, and an interpolation operating unit 136. The data holding unit 132 converts the audio input data which is inputted as serial data into the parallel data by a serial/parallel converter 138. The parallel data is sequentially held into registers 140, 142, and 144 of three stages which are serially connected in response to the sampling clock CL3 of 16 kHz. Therefore, assuming that the present data held in the register 140 is S(n), data S(n-1) of one period before is held in the register 142. Data S(n-2) of two periods before is held in the register 144. Selectors 146 and 148 select two new and old data from the three continuous input data S(n), S(n-1), and S(n-2) and supply to the interpolation operating unit 136. It is now assumed that the new data which is inputted to the interpolation operating unit 136 is set to A and the old data of one period before is set to B. The counter circuit 50 for interpolation has a counter 150. The counter 150 clears the count value cnt to 0 each time the sampling clock CL3 of 16 kHz is obtained. For a period of time until the next sampling clock CL3 is obtained, the counter 150 counts the fundamental clock CL1. Namely, the count value of the counter 150 changes in a range of cnt (=0 to 1058.4) at every sound source sampling period Ts of the sampling clock CL3. Subsequent to the counter 150, a first time position operating unit 152 and a second time position operating unit 154 to obtain time positions in the sound source sampling period Ts for obtaining the interpolation data at the time of the interpolation calculation are provided. A first time position CT1 obtained by the first time position operating unit 152 and a second time position CT2 obtained by the second time position operating unit 154 are supplied to a selector 158. The selector 158 is switched by a change-over control unit 156 and supplies the first time position CT1 or second time position CT2 as an interpolation time position C to the interpolation operating unit 136. At the same time, the change-over control unit 156 controls the selecting operations of the selectors 146 and 148. That is, when the first time position CT1 is selected, the one-preceding data S(n-1) and two-preceding data S(n-2) from the registers 142 and 144 are inputted as new data A and old data B to the interpolation operating unit 136 by the selectors 146 and 148. When the second time position CT2 is selected by the selector 158, outputs of the registers 140 and 142 are selected by the selectors 146 and 148. The present data S(n) and one-preceding data S(n-1) are inputted as new data A and old data B to the interpolation operating unit 136. The interpolation operating unit 136 calculates interpolation data X in accordance with the following equation $$X = A - (A-B)C/D \qquad (1)$$

on the basis of four parameters of the new data A, old data B, and time position C, and further sound source sampling period Ts=D of the sampling clock CL3 of 16 kHz.

Figure 11:
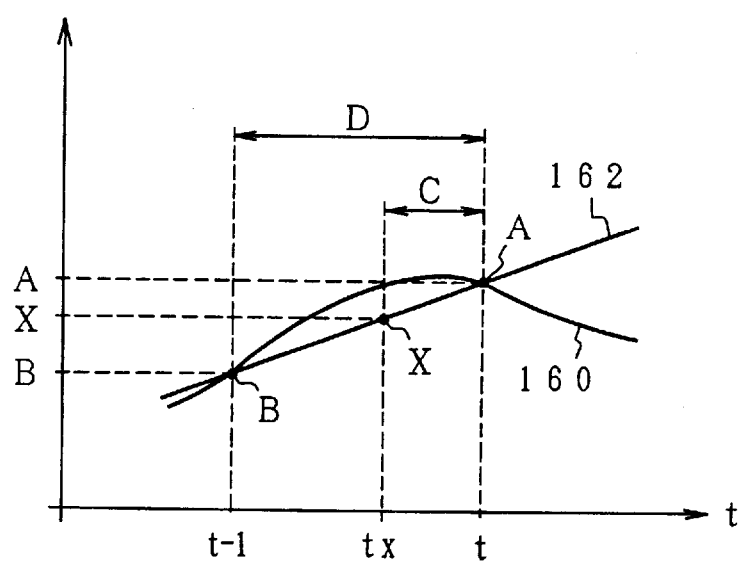
FIG. 11 is a principle explanatory diagram of the interpolating process.
Figure 12A:
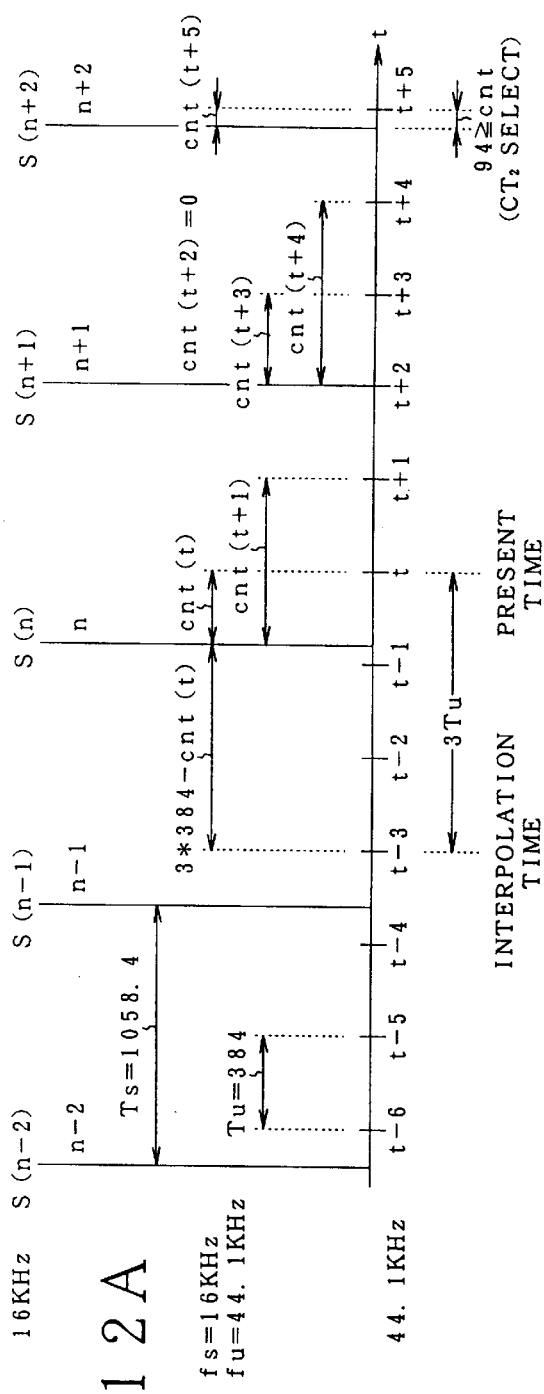
FIGS. 12A and 12B are timing explanatory diagrams for the interpolating process in the case where sound source sampling frequencies are set to 16 kHz and 48 kHz.

FIG. 11 is an explanatory diagram of a principle of the interpolating process of FIG. 10. With respect to a change in actual signal waveform 160, sample data is obtained at an interval of the sound source sampling period Ts=D of 16 kHz. It is now assumed that the preceding sampling clock CL3 is obtained at time t-1 and the present sample data A is obtained at time t. When two continuous data A and B are obtained as mentioned above, the data X at an arbitrary time position tx for an interval between them can be obtained by a linear interpolation. In the linear interpolation, an inclination of a straight line 162 connecting the previous data B and present data A is obtained and the interpolation time position C from the position of the data A at time t to the interpolating position tx is obtained. As mentioned above, when the new data A, old data B, a sound source sampling period D, and the interpolation time position C are obtained, the interpolation data X can be obtained by the equation (1). As for the interpolation time position C indicative of the time tx to obtain the sample data X in FIG. 11, the united clock frequency is equal to 44.1 kHz and the sound source sampling frequency is 16 kHz and those frequencies have a relation such that they cannot be perfectly divided. For instance, as shown in FIG. 12A, for the united sampling period Tu (=384) in an interval from time (t-6) to time (t+5), the sound source sampling period Ts (=1058.4 clocks) of the sample data S(n-2) to S(n+2) of 16 kHz is deviated every time. Therefore, for example, in case of performing the interpolating process at present time t in FIG. 12A, two data of one-preceding sample data S(n-1) and another one-preceding sample data S(n-) are necessary. Therefore, the interpolation at the timings (t-3), (t-2), and (t-1) of the three united sampling periods Tu (=384 clocks) in such an interval is executed. That is, the data interpolation at the time of three periods of the united clock period Tu before the present time t is executed. Now, assuming that the number of delay periods until the time (t-3) to perform the data interpolation for the present time t is set to Nd, the number (Nd) of delay periods can be obtained by the following equation.

$$\begin{aligned} Nd = INT(Ts/Tu) + 1 &= INT(1058.4/384) + 1 \\ &= INT(2.75626) + 1 \\ &= 2 + 1 \\ &= 3 \end{aligned} \qquad (2)$$

The equation (2) denotes a process such that "1" is added to the value obtained by rounding a ratio (Ts/Tu) of the input sound source sampling period Ts and the united sampling period Tu into an integer. Therefore, in case of the period Ts (=1058.4) of the input sound source sampling frequency of 16 kHz and the period Tu (=384) of the united sampling frequency of 44.1 kHz in FIG. 12A, the number (Nd) of delay periods can be obtained as 3. When the number (Nd) of delay periods as an interpolation target for the present time is obtained as mentioned above, for example, the interpolation times to interpolate at the present times t, t+1, and t+2 in FIG. 12A are set to t−3, t−2, and t−1, respectively. With respect to the interpolation at interpolation times t−3, t−2, and t−1, it is sufficient to obtain the interpolation time position C from the sample data S(n−1) and S(n) before and after the present time and the timing (n) of the sample data S(n). First, with regard to the present times t and t+1, since the counter performs the continuous counting operation after the count value cnt was cleared to 0 at the timing when the sample data S(n) was held, the count value cnt can be obtained by calculating from the value that is three times as large as the united sampling period Tu (=384 clocks). This value corresponds to the second time position CT2 and is generally expressed as follows.

$$CT2 = (Nd \times Tu) - cnt \tag{3}$$

In the embodiment, since the input sound source sampling frequency is equal to 16 kHz and the united sampling frequency is equal to 44.1 kHz, $$\begin{aligned} CT2 &= (3 \times 384) - cnt \\ &= 1152 - cnt \end{aligned} \tag{4}$$

The second time position CT2 in the equation (4) is calculated by the second time position operating unit 154 in FIG. 10.

When the present time is t+2, the next sample data S(n+1) is obtained and the count value cnt at this time is equal to 0. Therefore, the time position CT2 of the equation (4) cannot be used. In this case, the first time position CT1 of the following equation is generally used.

$$CT1 = \{(Nd \times Tu) - cnt\} - Ts \tag{5}$$

In case of the input sound source sampling frequency of 16 kHz and the united sampling frequency of 44.1 kHz, $$\begin{aligned} CT1 &= \{(3 \times 384) - cnt\} - 1058.4 \\ &= 93.6 - cnt \end{aligned} \tag{6}$$

That is, the time position CT1 is equal to a difference obtained by subtracting the value of the count value cnt which was cleared at the sampling timing from a difference, namely, what is called ΔT (=93.6) obtained by subtracting the input sound source sampling period TS from the value which is obtained by multiplying the number (Nd) of delay period to the united sampling frequency Tu. The first time position CT1 of the equation (6) is calculated by the first time position operating unit 152 in FIG. 10. Further, with respect to the interpolation of the time (t−1) at the present time (t+2), since the new sample data S(n+1) is held in this instance, the new and old data A and B which are used for the interpolation calculation are updated to A=S(n+1) and B=S(n) as they are. Therefore, the switching of the holding data to return to A=S(n) and B=S(n−1) is needed.

The change-over control unit 156 in FIG. 10 generally executes the comparison arithmetic operation of the following expression.

$$\{(Nd \times Tu) - Ts\} \geq cnt \tag{7}$$

In case of the input sound source sampling frequency of 16 kHz and the united sampling frequency of 44.1 kHz, the comparison operation is as follows.

$$\{(3 \times 384) - 1058.4\} \geq cnt \tag{8}$$

$$93.6 \geq cnt$$

That is, ΔT (=93.6) and the count value cnt are compared. Until the count value cnt is cleared to 0 by the sampling timing and the difference ΔT increases to 93.6, the first time position CT1 is selected by the selector 158 in FIG. 10, the one-preceding data S(n−1) and two-preceding data S(n−2) are selected as new data A and old data B by the selectors 146 and 148, and the interpolation operation is executed by the interpolation operating unit 136.

The above operations will now be summarized as follows. When 93.6≥cnt,

A=S(n−1)
B=S(n−2)
C=CT1
D=Ts=1058.4

$$X = S(n-1) - \{S(n-1) - S(n-2)\} \cdot CT1/1058.4 \tag{9}$$

Specifically speaking, for example, the interpolation data at time t−1 of three periods before at the present time t+2 in FIG. 12A is calculated.

On the other hand, when the count value cnt is ΔT=93.6 or more, for example, in case of the interpolation times t−3 and t−2 corresponding to the present times t and t+1 in FIG. 12A, the change-over control unit 156 in FIG. 10 allows the selector 158 to select the second time position CT2 and allows the selectors 146 and 148 to select the present data S(n) and one-preceding data S(n−1) as new and old data A and B. The interpolation data X is calculated by the interpolation operating unit 136.

The above processes will now be summarized as follows. When 93.6 <cnt,

A=S(n)
B=S(n−1)
C=CT2
D=Ts=1058.4

$$X = S(n) - \{S(n) - S(n-1)\} \cdot CT2/1058.4 \tag{10}$$

The interpolation data X(t−3), X(t−2), X(t−1), and X(t) at times t−3, t−2, t−1, and t of three (Nd=3) periods before which are operated at times t, t+1, t+2, and t+3 in FIG. 12A are as follows.

$$X(t-3) = S(n) - \{S(n) - S(n-1)\} \times \{(3 \times 384) - cnt(t)\}/1058.4$$

$$X(t-2) = S(n) - \{S(n) - S(n-1)\} \times \{(3 \times 384) - cnt(t+1)\}/1058.4$$

$$X(t-1) = S(n) - \{S(n) - S(n-1)\} \times \{(3 \times 384) - cnt(t+2) - 1058.4\}/1058.4$$

$$X(t) = S(n+1) - \{S(n+1) - S(n)\} \times \{(3 \times 384) - cnt(t+1)\}/1058.4$$

Figure 12B:
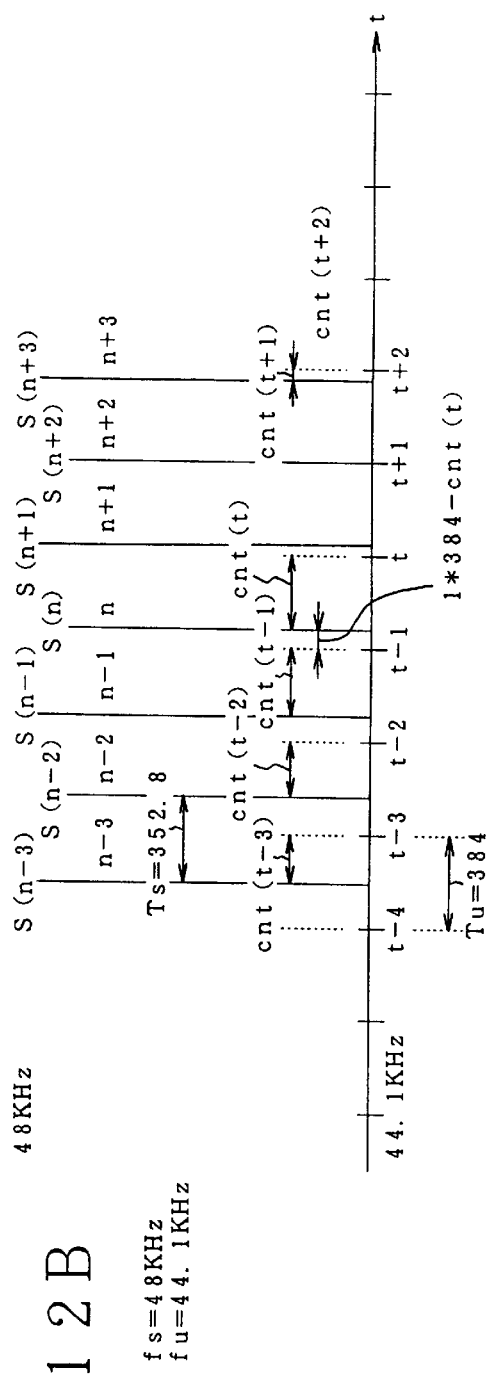

FIG. 12A shows an interpolating process in the case where a sound source sampling frequency fs is equal to 16 kHz, that is lower than the united sampling frequency fu=44.1 kHz. On the contrary, FIG. 12B shows an interpolating process in the case where the sound source sampling frequency fs is equal to, for example, 48 kHz, that is higher than the united sampling frequency fu=44.1 kHz. In this case, the sound source sampling period Ts is equal to 352.8 and the number (Nd) of delay periods of the equation (2) is $$Nd = INT(352.8/384) + 1 = 1$$

Therefore, the interpolation data of one period before is calculated at every sampling time. That is, the interpolation data X(t−3), X(t−2), X(t−1), X(t), and X(t+1) at times t−3, t−2, t−1, t, and t+1 of one (Nd=1) period before which are respectively operated at times t−2, t−1, t, t+1, and t+2 in FIG. 12B are as follows.

$$X(t-3)=S(n-2)-\{S(n-2)-S(n-3)\}\times\{(1\times384)-cnt(t-2)\}/352.8$$

$$X(t-2)=S(n-1)-\{S(n-1)-S(n-2)\}\times\{(1\times384)-cnt(t-1)\}/352.8$$

$$X(t-1)=S(n)-\{S(n)-S(n-1)\}\times\{(1\times384)-cnt(t)\}/352.8$$

$$X(t)=S(n+1)-\{S(n+1)-S(n)\}\times\{(1\times384)-cnt(t+1)-352.8\}/352.8$$

$$X(t+1)=S(n+3)-\{S(n+3)-S(n+2)\}\times\{(1\times384)-cnt(t+2)\}/352.8$$

Figure 13:
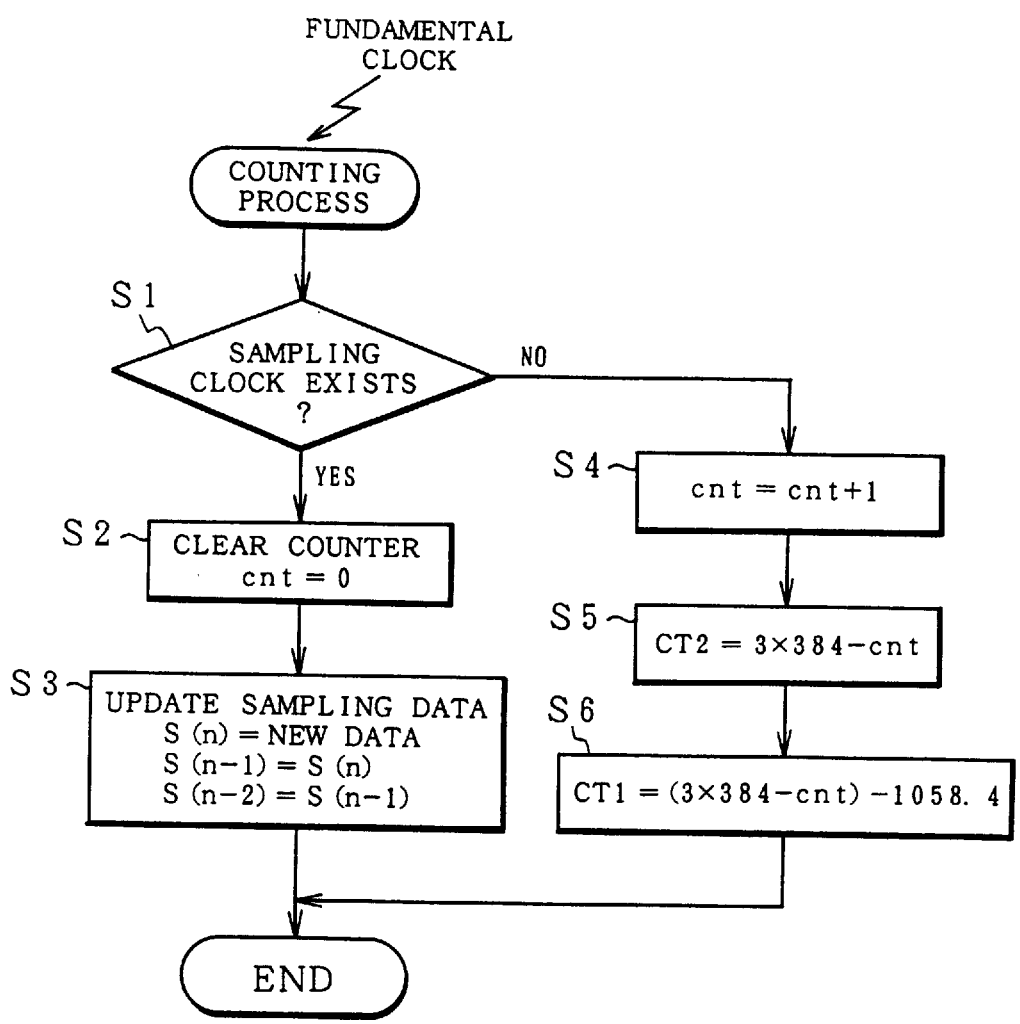
FIG. 13 is a flowchart for the processing operation of a counting process in FIG. 10.

FIG. 13 is a flowchart for processes synchronized with the fundamental clock CL1 of the counter circuit 50 and data holding unit 132 in FIG. 10. Each time the fundamental clock is obtained, the processes in flowchart of FIG. 13 are executed. First in step S1, a check is made to see if the sampling clock has been obtained. When the sampling clock is obtained, the count value cnt of the counter 150 is cleared to cnt =0 in step S2. In step S3, the sample data is updated. That is, the sample data S(n) in the register 140 is updated to the new data and the data in the register 140 is shifted into the register 142 and the data is updated to S(n−1)=S(n). Further, the data in the register 142 is shifted into the register 144, thereby setting S(n−2)=S(n−1). At a timing when no sampling clock is derived in step S1, the counter 150 is counted up in step S4, thereby increasing the count value cnt by "1". In step S5, the second time position CT2 is obtained by using the updated count value cnt. In step S6, the first time position CT1 is obtained. The first time position CT1 is equal to the value obtained by subtracting the sound source sampling period Ts=1058.4 from the value of the second time position CT2.

Figure 14:
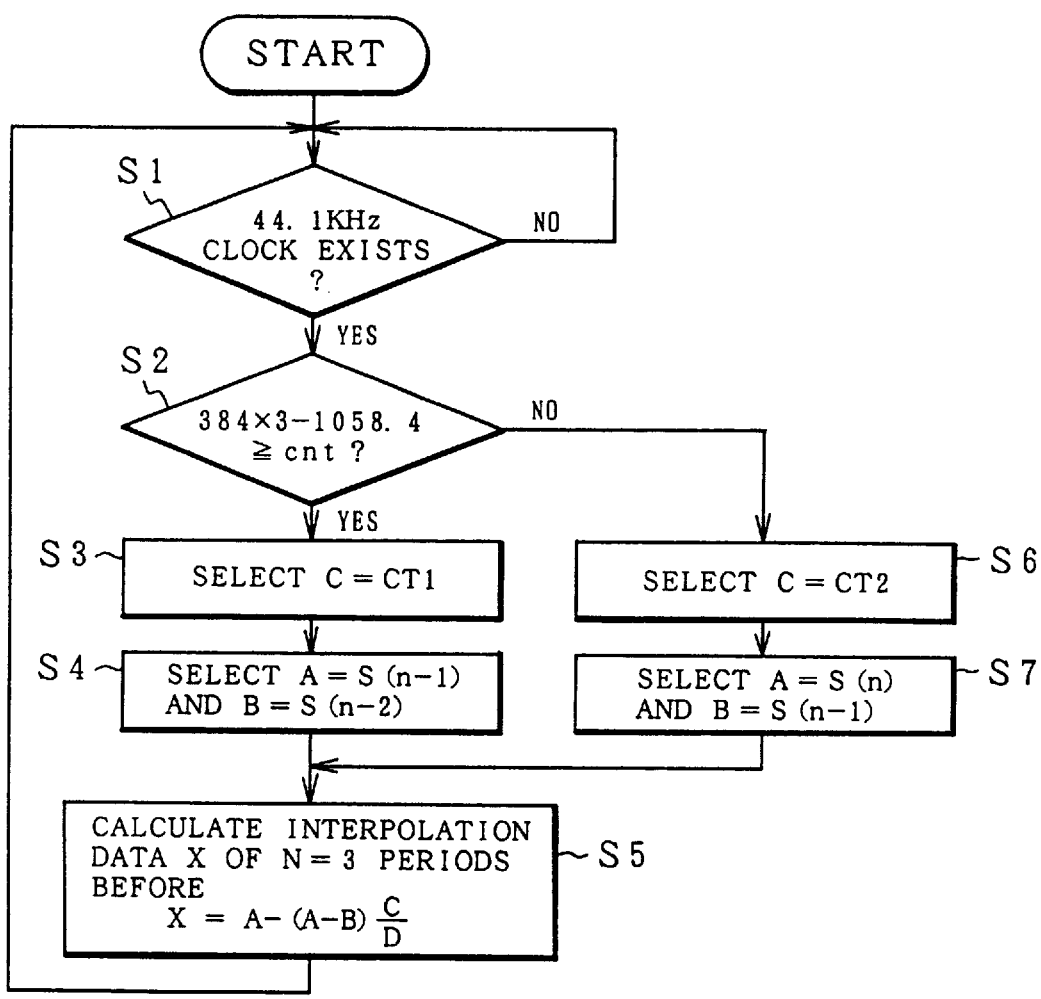
FIG. 14 is a flowchart showing a change-over selection and an interpolation calculation based on a count value in FIG. 10.

FIG. 14 is a flowchart for an arithmetic operating process of the interpolation data X based on the selection of the time positions CT1 and cT2 by the change-over control unit 156 provided for the counter circuit 50 in FIG. 10 and the selection of the new and old data by the selectors 146 and 148. First in step S1, the presence or absence of the clock CL2 of the united sampling frequency 44.1 kHz is discriminated. When the united sampling clock CL2 is obtained, step S2 follows. As a comparison operation of the change-over control unit 156, ΔT=93.6 and the count value cnt at that time are compared. When the count value cnt is equal to or less than ΔT=93.6 at this time, step S3 follows and the first time position CT1 is calculated as a time position C. In step S4, the new data A=S(n−1) and old data B=S(n−2) are selected. In step S5, the interpolation data X is calculated. D in the interpolation calculation denotes the input sound source sampling period Ts(=1058.4 clocks). On the other hand, when the count value cnt exceeds ΔT=93.6 in step S2, step S6 follows and the second time position CT2 is selected as a time position C. In step S7, the new data A =S(n) and old data B=S(n−1) are selected. After that, the interpolation data X is calculated in step S5.

Figure 15:
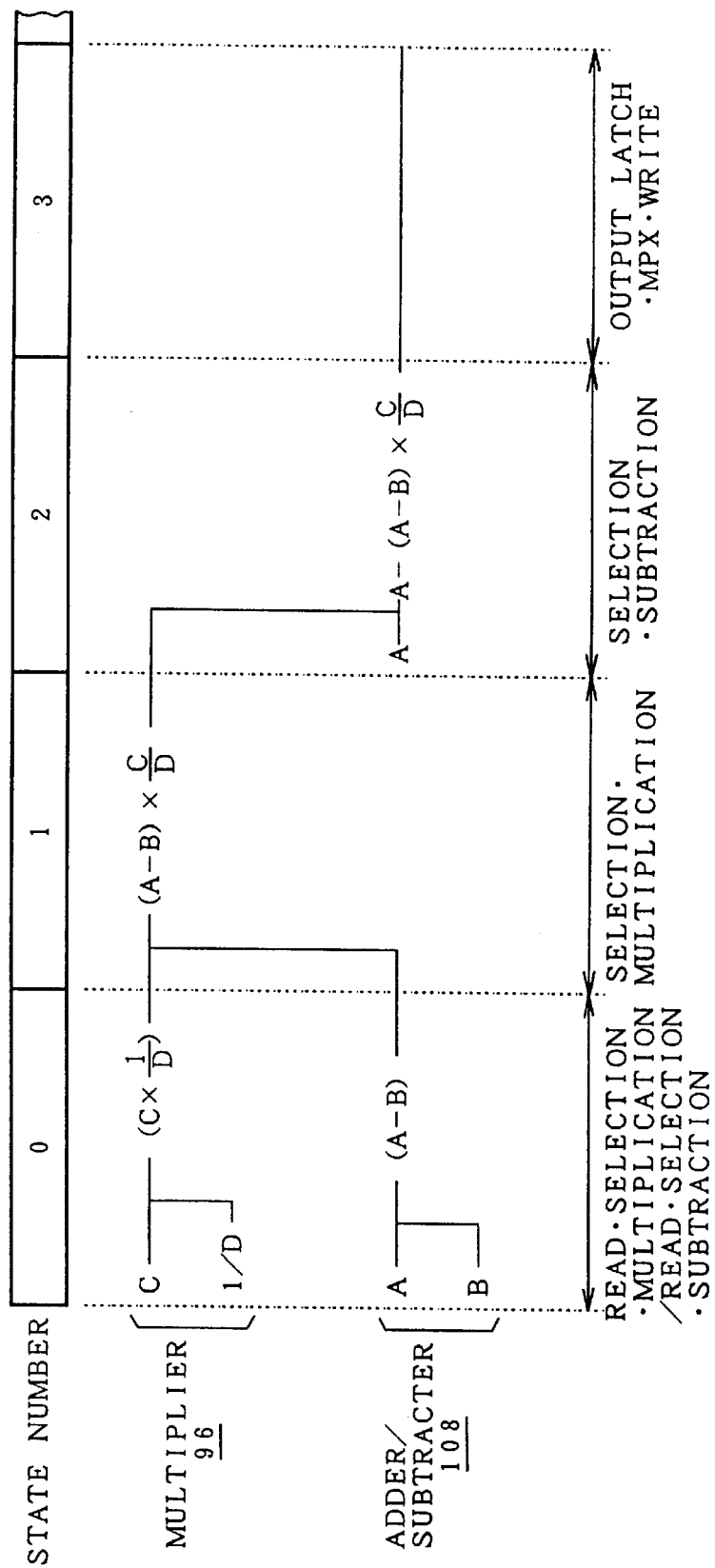
FIG. 15 is an operation explanatory diagram of the circuit in FIG. 5 to realize a function of an interpolation operating unit in FIG. 10.

FIG. 15 is a timing chart in the case where the arithmetic operating process of the interpolation data X by the interpolation operating unit 136 in FIG. 10 is executed by the multiplication pipeline circuit 80-1 and addition/subtraction pipeline circuit 80-2 shown in FIG. 5. FIG. 15 shows the operation in the multiplier 96 and adder/subtracter 108 corresponding to the state number that is decided by the fundamental clock CL1. In the state number 0, the interpolation time position C and a constant 1/D which is given by a reciprocal of the input sound source sampling period D are selected by the selectors 88 and 90 on the multiplier 96 side.

A multiplication of (C×1/D) is performed by the multiplier 96 through the register 92. The result is latched into the output register 98. In parallel with the multiplication on the multiplier 96 side, the selectors 100 and 102 select the new data A and old data B on the adder/subtracter 108 side, respectively, and supply to the adder/subtracter 108 through the registers 104 and 106. In this instance, the adder/subtracter 108 executes a subtraction (A−B) because it is set to the subtracting operating mode. In the next state number 1, the multiplication result (C×1/D) on the multiplier 96 side and the subtraction result (A−B) on the adder/subtracter 108 side are selected by the selectors 88 and 90 and inputted to the multiplier 96. The multiplication result [(A−B)·(C/D)] between them is obtained. In the next state number 2, the multiplication result on the multiplier 96 side is subtracted from the selection result of the new data A by the adder/subtracter, thereby calculating the interpolation data X. In the last state number 3, the operation result of the adder/subtracter 108, namely, the interpolation data X is shifted to the register 110 with the shifting function. After that, a writing operation for selecting the data X by the multiplexer 112 and writing into the data memory 48 is performed.

[Sound volume adjusting process]

Figure 16:
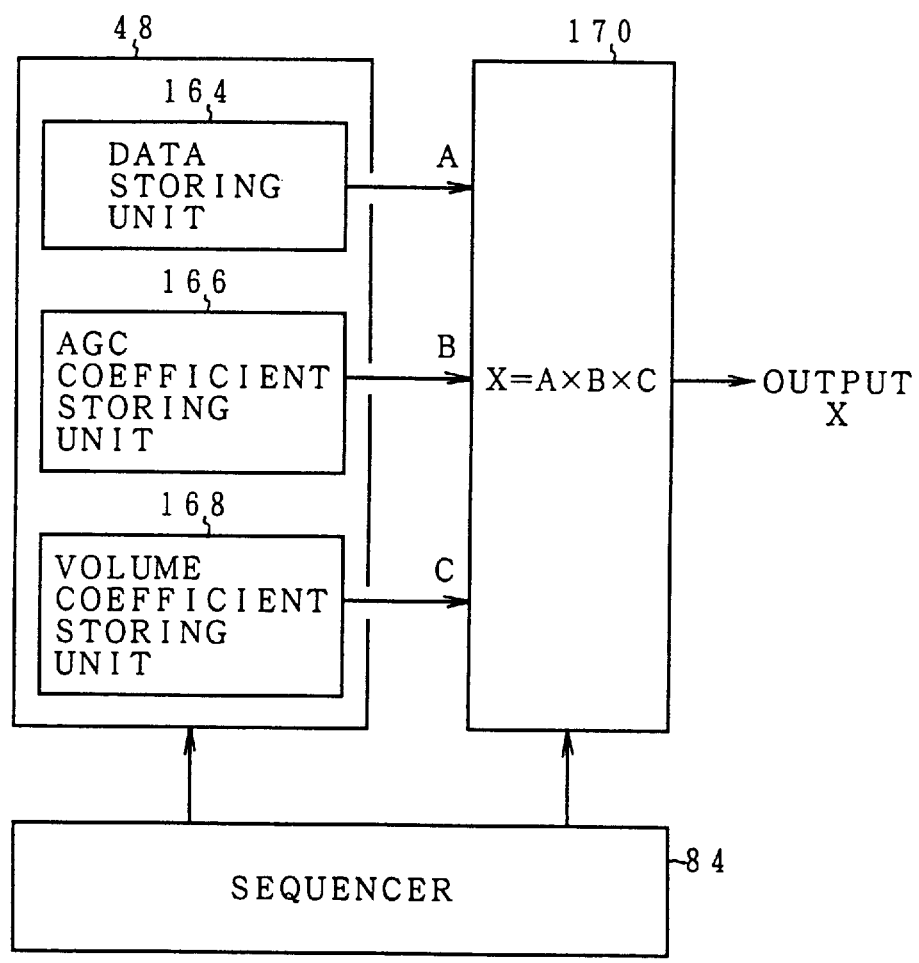
FIG. 16 is a functional block diagram of a sound volume adjustment provided for the first processing circuit in FIG. 4.

FIG. 16 is a diagram showing a functional block of a sound volume adjusting process which is executed on the first processing circuit 80 side of the data processing unit 10 in FIG. 4. In the sound volume adjusting process, the audio data as a target of the sound volume adjustment stored in a data storing unit 164 in the data memory 48 is read as input data A into a sound volume adjusting unit 170. AGC coefficients which have been stored in an AGC coefficient storing unit 166 in the data memory 48 and are used to adjust to a predetermined level are also read as input data B. Further, volume coefficients which have been stored in a volume coefficient storing unit 168 in the data memory 48 and were set by an adjusting operation are read as input data C. The output data X is obtained as follows.

$$X = A \times B \times C \tag{11}$$

A: data
B: AGC coefficients
C: volume coefficients

That is, the input data B as an AGC coefficient to adjust to the predetermined level is first multiplied to the input data A as a target of the sound volume adjustment. After that, the input data C of the volume coefficient set from the outside is multiplied to the multiplication result, thereby obtaining the output data X which was sound volume adjusted. The volume coefficient can be also directly inputted without storing into the data memory 48. The sound volume adjusting unit 170 can be realized by using the multiplication pipeline circuit 80-1 in FIG. 5. A control operation shown in, for example, a timing chart of FIG. 17 is executed by the sequencer 84. In the sound volume adjustment control in FIG. 17, in the state number 0, the audio data A as an adjustment target and the input data B of the AGC coefficient are selected and the multiplication result (A×B) is obtained on the multiplier 96 side. In the next state number 1, the multiplication result is fed back and selected, the input data C of the volume coefficient is selected, and they are multiplied, thereby obtaining the output data X which was sound volume adjusted. In the last state number 2, the writing operation to the output latch, multiplexer, and data memory is executed.

[Filtering process]

FIG. 18 is a diagram showing a functional block of a filtering process which is executed on the second processing circuit 82 side provided for the data processing unit 10 in FIG. 4. A data storing unit 172 in which audio data as a filtering target has been stored and a filter coefficient storing unit 174 in which filter coefficients which are used for filtering have been stored are provided in the data memory 48. A filter operating unit 176 executes an arithmetic operating process to realize, for example, a digital filter of a finite impulse response type and realizes a process of a low pass filter to cut out high frequency noises included in the audio data by the interpolating process which has already been described. An arithmetic operation for the digital process of the low pass filter of the finite impulse response type is given by the following equation.

$$X = \sum_{T=1}^{N} (A \times B) \quad (12)$$

A: data
B: filter coefficients
C: degree (for example, 57)

Namely, in the digital filter of the finite impulse response type, the filter coefficient of a finite degree having predetermined distributions by an impulse response at locations of a time base before and after a target data, as a center, which is at present a processing target is used, and the sum of the products of the values of the filter coefficients and the input data is calculated. For example, when the degree of the finite impulse response is set to N=57, in the filter arithmetic operation of one time, the product sum calculation using the data as many as 57 degrees stored in the data storing unit 172 and the filter coefficients stored in the filter coefficient storing unit 174 is repeated in accordance with the control of the sequencer 86. Although a logic construction of the second processing circuit 82 in FIG. 4 to realize the filter operating unit 176 is substantially the same as that in FIG. 5, when the product sum calculation is repeated, the addition result is not latched into the register 110 with the shifting function at the output stage of the addition/subtraction pipeline circuit 80-2 but is directly fed back to the selector 102, thereby promptly interlocking with the next arithmetic operation cycle.

Figure 19:
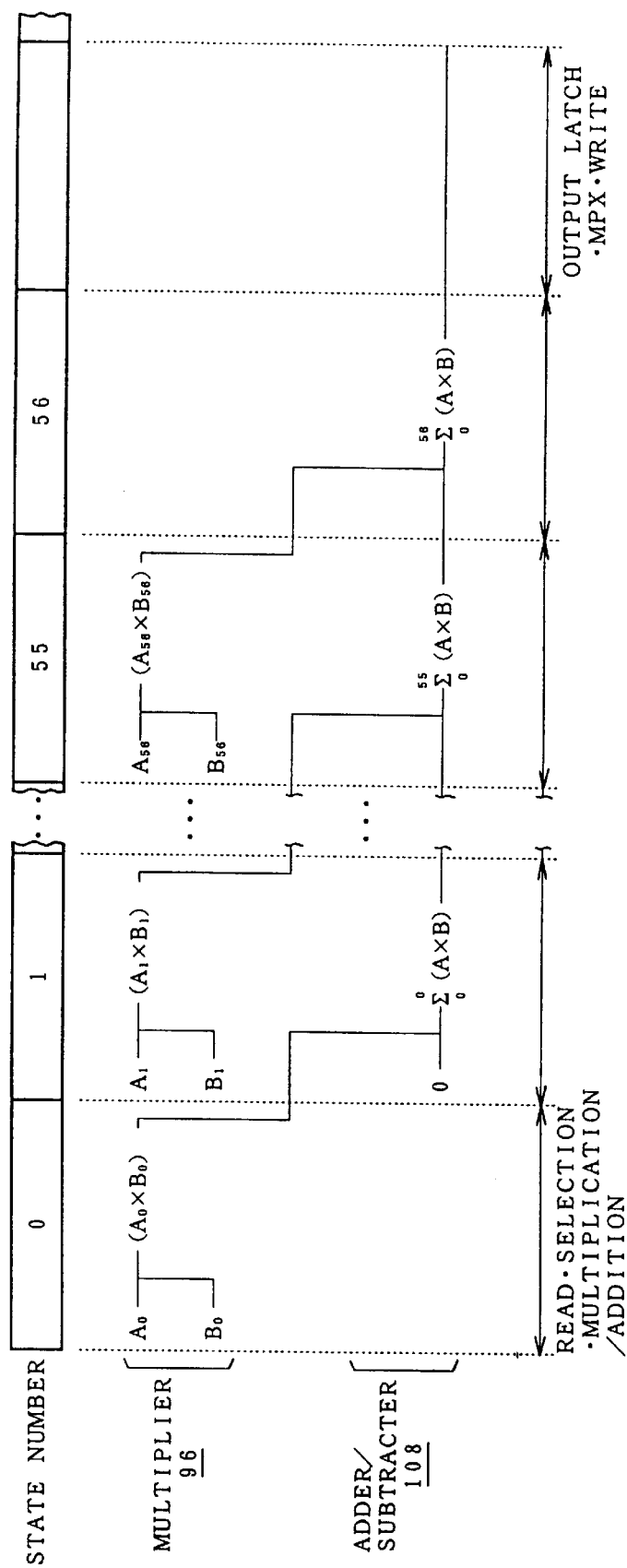
FIG. 19 is an operation explanatory diagram of the circuit in FIG. 5 for realizing a function of the filtering process in FIG. 18.

FIG. 19 is a timing chart for an arithmetic operating process in the filter operating unit 176 having the multiplication pipeline circuit 80-1 and the addition/subtraction pipeline circuit 80-2 in FIG. 5 by the sequencer 86 in FIG. 18. First, in the state number 0, the multiplier 96 side selects data A0 and a filter coefficient B0 and multiplies them. In the next state number 1, the multiplication result is inputted to the adder/subtracter 108 and is added to the previous addition result (initially, 0). At the same time, on the multiplier 96 side, next data A1 and filter coefficient B1 are inputted, thereby obtaining a multiplication result (A1×B1). The above processes are continuously repeated for 57 states of T=1 to 57. In the last state number 57, the result of the product sum calculations as many as 57 degrees of the adder/subtracter 108 is written as filter output data into the data memory 48 through the output latch and multiplexer.

[Mixing process]

Figure 20:
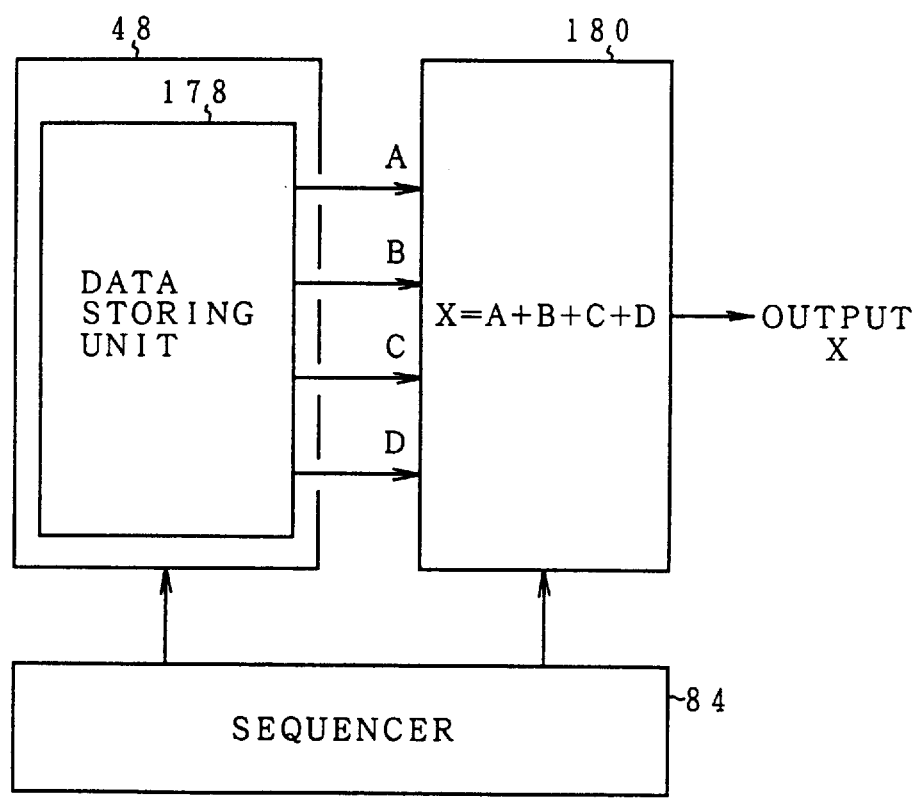
FIG. 20 is a functional block diagram of a mixer output process provided for the first processing circuit in FIG. 4.

FIG. 20 is a functional block diagram of a mixing process which is executed on the first processing circuit 80 side provided for the data processing unit 10 in FIG. 4. In the mixing process, a data storing unit 178 in which digital data as a target of the mixing has been stored is provided for the data memory 48. In the example, it is assumed that four kinds of digital data A, B, C, and D are selected and mixed. The sequencer 84 reads out the data A to D from the data storing unit 178 in the data memory 48 at predetermined mixing timings, thereby allowing a mixer operating unit 180 to perform the following mixing arithmetic operation.

$$X = A+B+C+D \quad (13)$$

The process of the mixer operating unit 180 can be realized by the control of the addition/subtraction pipeline circuit 80-2 in FIG. 5 by the sequencer 84.

Figure 21:
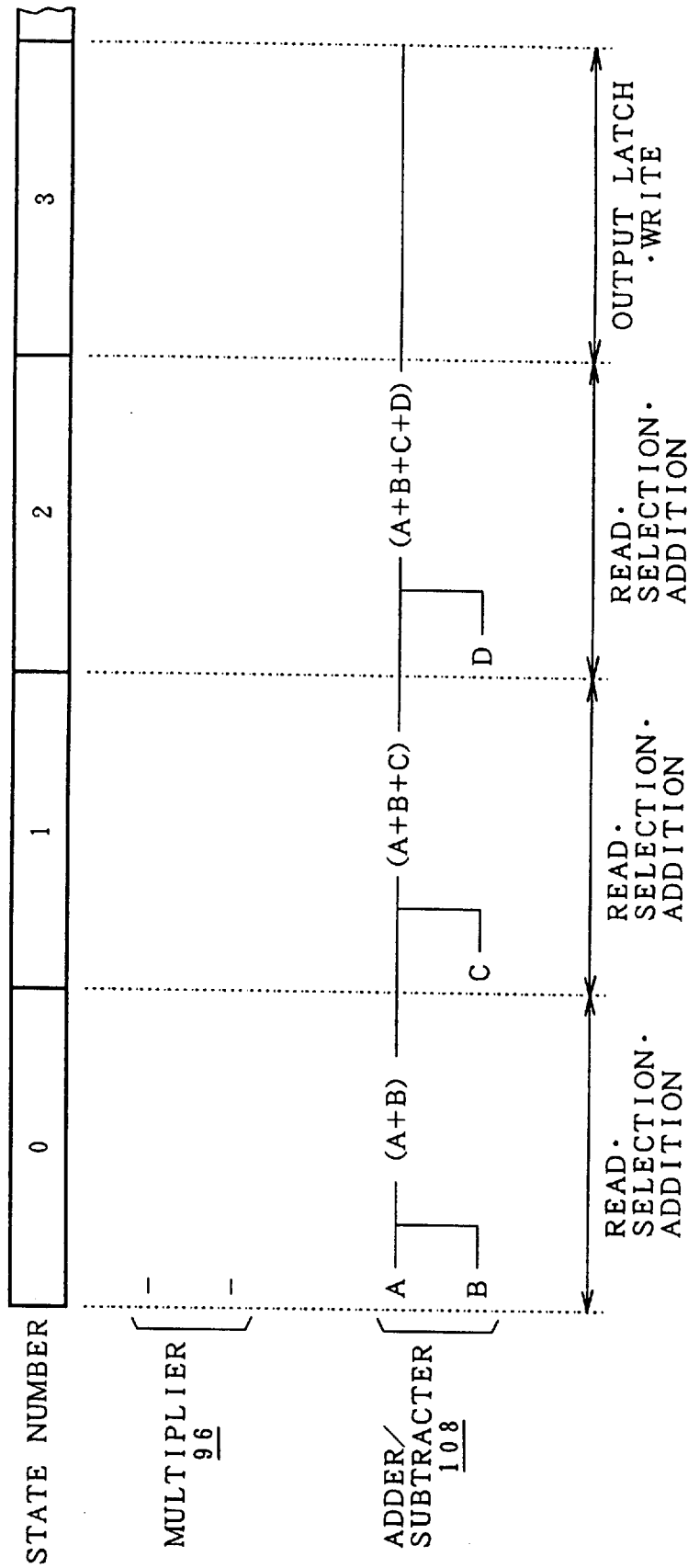
FIG. 21 is an operation explanatory diagram of the circuit in FIG. 5 to realize a function of the mixer output process in FIG. 18.

FIG. 21 is a timing chart for the mixing process of the mixer operating unit 180 by the sequencer 84 in FIG. 20. First, in the state number 0, the first two data A and B are selected and added on the adder/subtracter 108 side. In the next state number 1, the preceding addition result (A+B) and the new data C are selected and added. In the state number 2, similarly, the last data D is selected and added to the addition result so far. In the last state number 3, the addition result of the adder/subtracter 108 is latched as mixer output data and, after that, it is written into the data memory. In the timing chart of FIG. 21, although the mixed output data X is written into the data memory 48 in the state number 3, the process by the mixer is the final stage process in the data processing unit 10 as will be obviously understood from the functional block of FIG. 3. Therefore, the data X is stored into the register 110 with the shifting function at the output stage of the adder/subtracter 108 of the addition/subtraction pipeline circuit 80-2 in FIG. 5. After that, the data X is converted to the parallel data by the shifting operation. The parallel data is outputted from the multiplexer 112 to the external D/A converter 44 and is converted into the analog data. The analog data is outputted to the line.

[Another embodiment]

Figure 22:
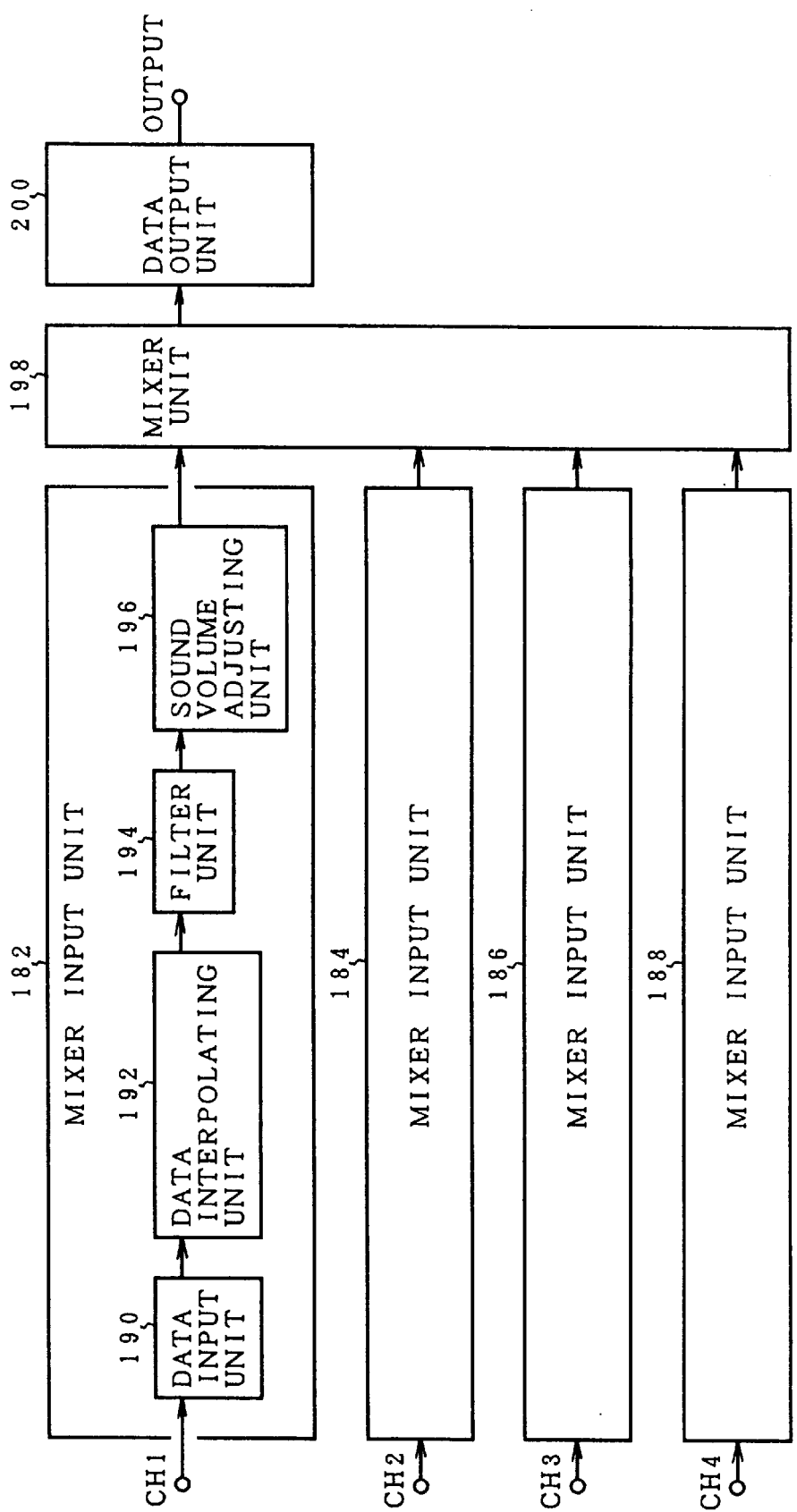
FIG. 22 is a functional block diagram of another embodiment of the data processing circuit in FIG. 2.

FIG. 22 is a functional block diagram of another embodiment of the invention which is realized by the data processing unit 10 in FIG. 10 having the multiplication pipeline circuit and addition/subtraction pipeline circuit in FIG. 5. In the embodiment, as for each of the mixer input units 182, 184, 186, and 188 of the input channels CH1 to CH4, as shown in the mixer input unit 182 as a representative, the mixer input unit 182 is constructed by a data input unit 190, a data interpolating unit 192, a filter unit 194, and a sound volume adjusting unit 196. All of the mixer input units receive the audio data of sound source sampling frequencies which are different from the united sampling frequency 44.1 kHz and process. After that, the processed audio data is further processed by a mixer unit 198 and is finally outputted as an analog audio signal from a data output unit 200 having a D/A converter to the line.

Figure 23:
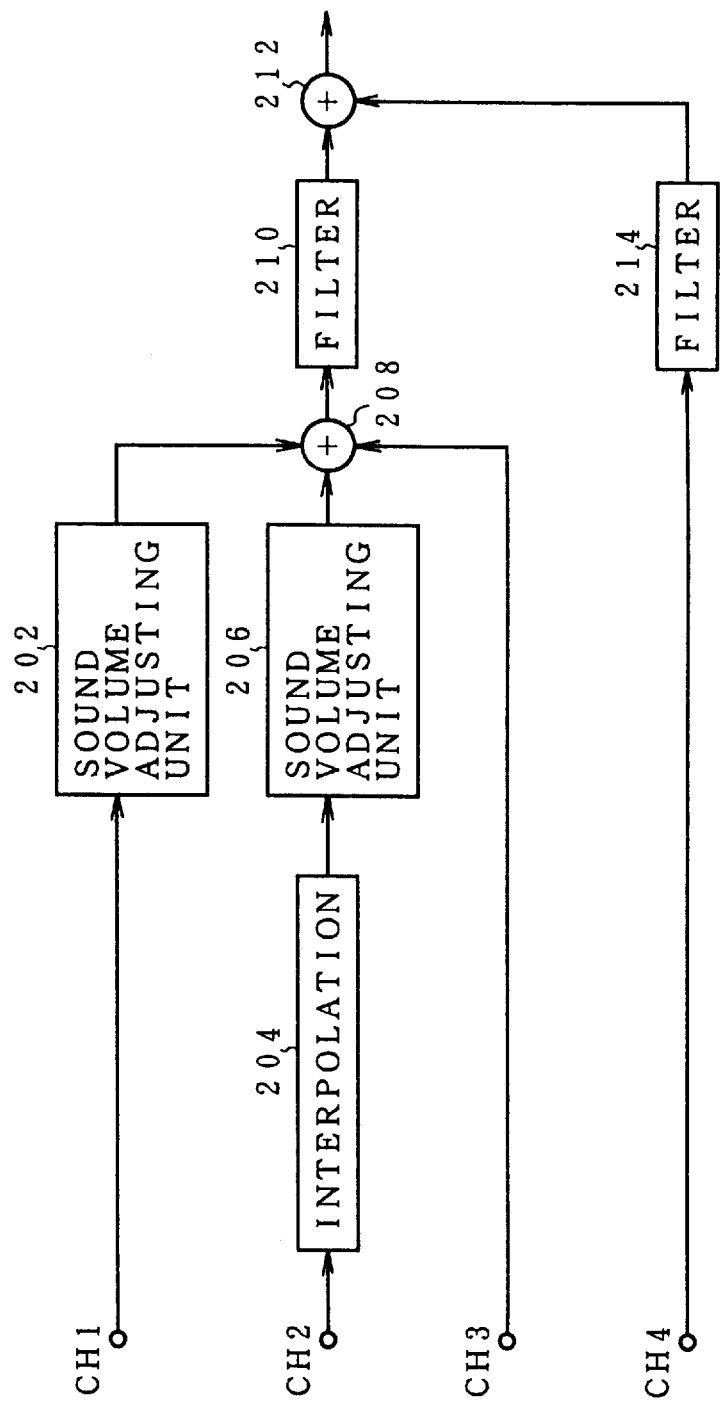
FIG. 23 is a functional block diagram of further another embodiment of the data processing circuit in FIG. 2.

FIG. 23 shows another embodiment of the invention and uses different processing forms of the digital audio data with respect to the channels CH1 to CH4. That is, with respect to the channel CH1, only a sound volume adjusting unit 202 is provided. With respect to the channel CH2, since the sound source sampling frequency differs, an interpolating unit 204 and a sound volume adjusting unit 206 are provided. Further, a mixer unit 208 for mixing the data on the channel CH1 side and channel CH3 side is provided. Finally, an output data of a filter unit 214 of the channel CH4 is mixed by a mixer unit 212 through a filter unit 210, thereby enabling a mixed result to be outputted. Such processes to the digital audio data in the channels CH1 to CH4 in FIG. 23 can be also easily realized by the processes shown in FIGS. 4 to 21 for realizing the functional block of the data processing unit 10 in FIG. 3.

[Measurement of sound source sampling frequencies and interpolating process]

Figure 24:
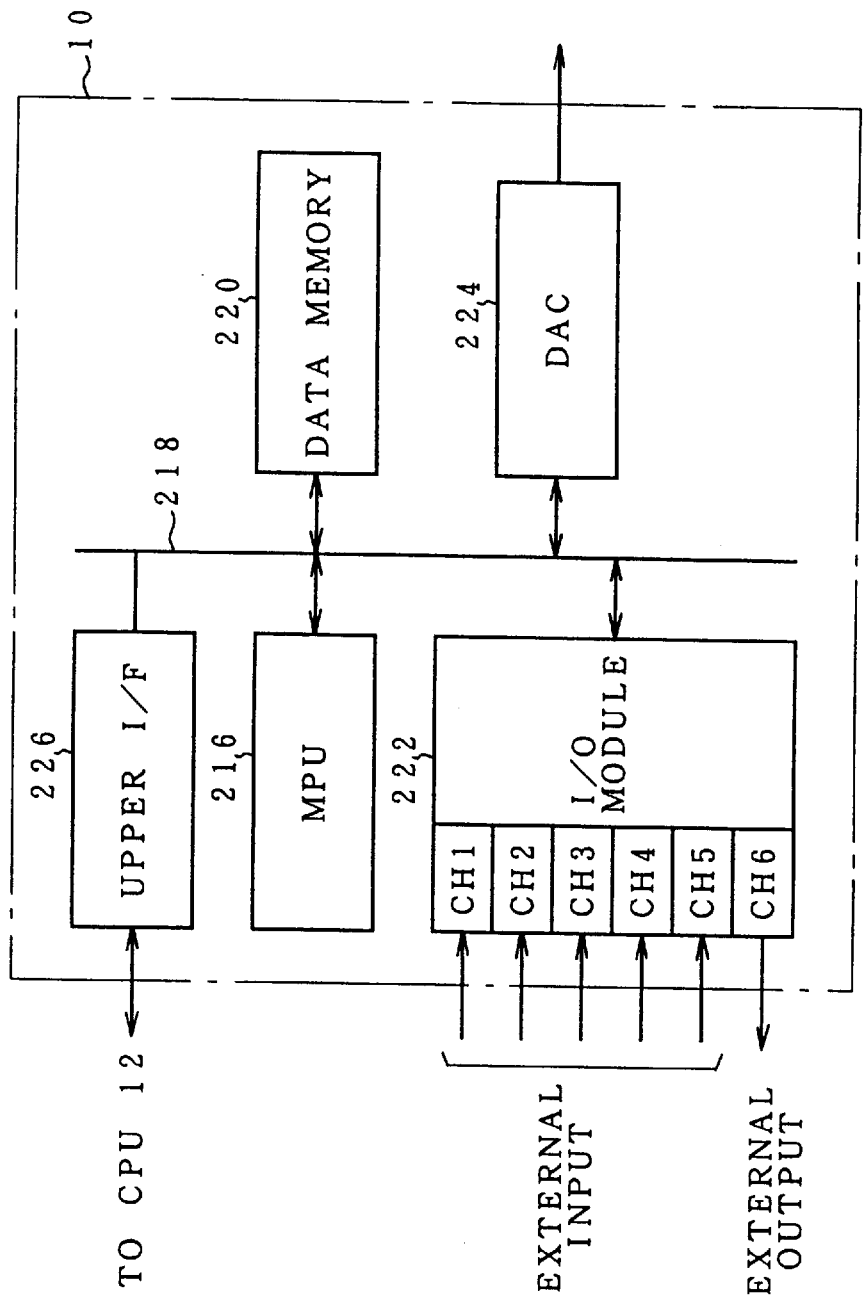
FIG. 24 is a block diagram of an operation environment to realize the data processing circuit in FIG. 2 in a processor process.

FIG. 24 shows an embodiment to realize the data processing unit 10 in FIG. 2 by a program control by a processor. As compared with the case of using the logic circuit of FIG. 5, a flexibility of various processes of the digital audio signals can be further raised. An MPU 216 is provided for the data processing unit 10. A data memory 220, an input/output module 222 having the channels CH1 to CH6 for external input and output, a D/A converter 224 for converting the processed digital audio signal into the analog audio signal and outputting, and an upper interface 226 for the upper CPU 12 in FIG. 2 are connected to a bus 218.

Figure 25:
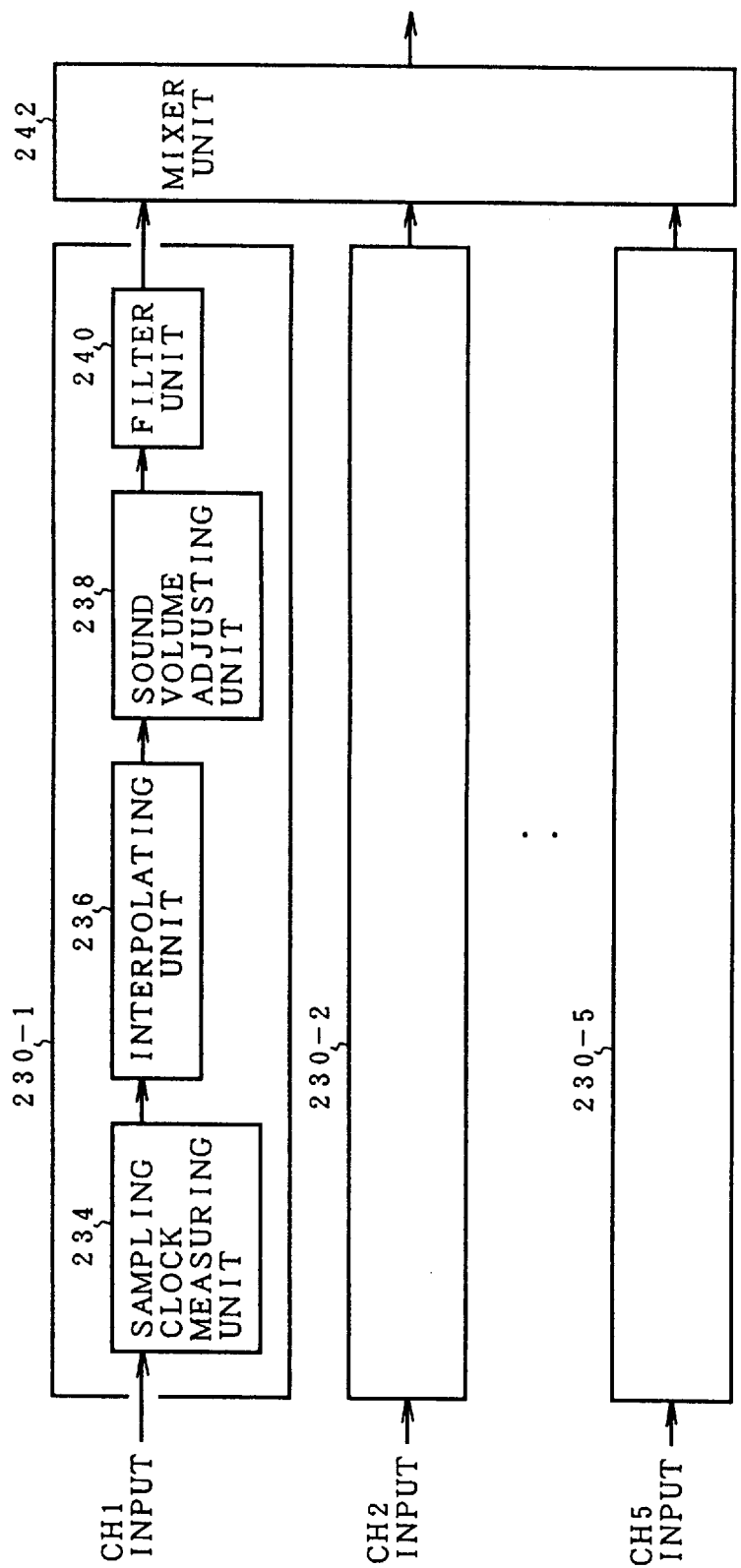
FIG. 25 is a functional block diagram of a data processing circuit which is realized by a processor in FIG. 24.

FIG. 25 is a functional block diagram of the data processing unit 10 of the invention which is realized by a program control of the MPU 216 in FIG. 24. In the embodiment, five mixer input units 230-1 to 230-5 are provided in correspondence to the channel inputs CH1 to CH5. As for each of the mixer input units 230-1 to 230-5, as shown in the mixer input unit 230-1 as a representative, the mixer input unit 230-1 is constructed by a sampling clock measuring unit 234, an interpolating unit 236, a sound volume adjusting unit 238, and a filter unit 240. The sampling clock measuring unit 234 measures the sound source sampling frequency from arbitrary digital audio data which is inputted from the channel CH1 and decides an interpolating process in the interpolating unit 236 in accordance with the measurement result of the sound source sampling frequency. In the data processing unit 10, the united sampling frequency 44.1 kHz is used and the relation between the united sampling period Tu and the period Ts of the sound source sampling frequency of the input digital audio signal measured by the sampling clock measuring unit 234 is calculated, thereby deciding the process of the interpolating unit 236.

Figure 26:
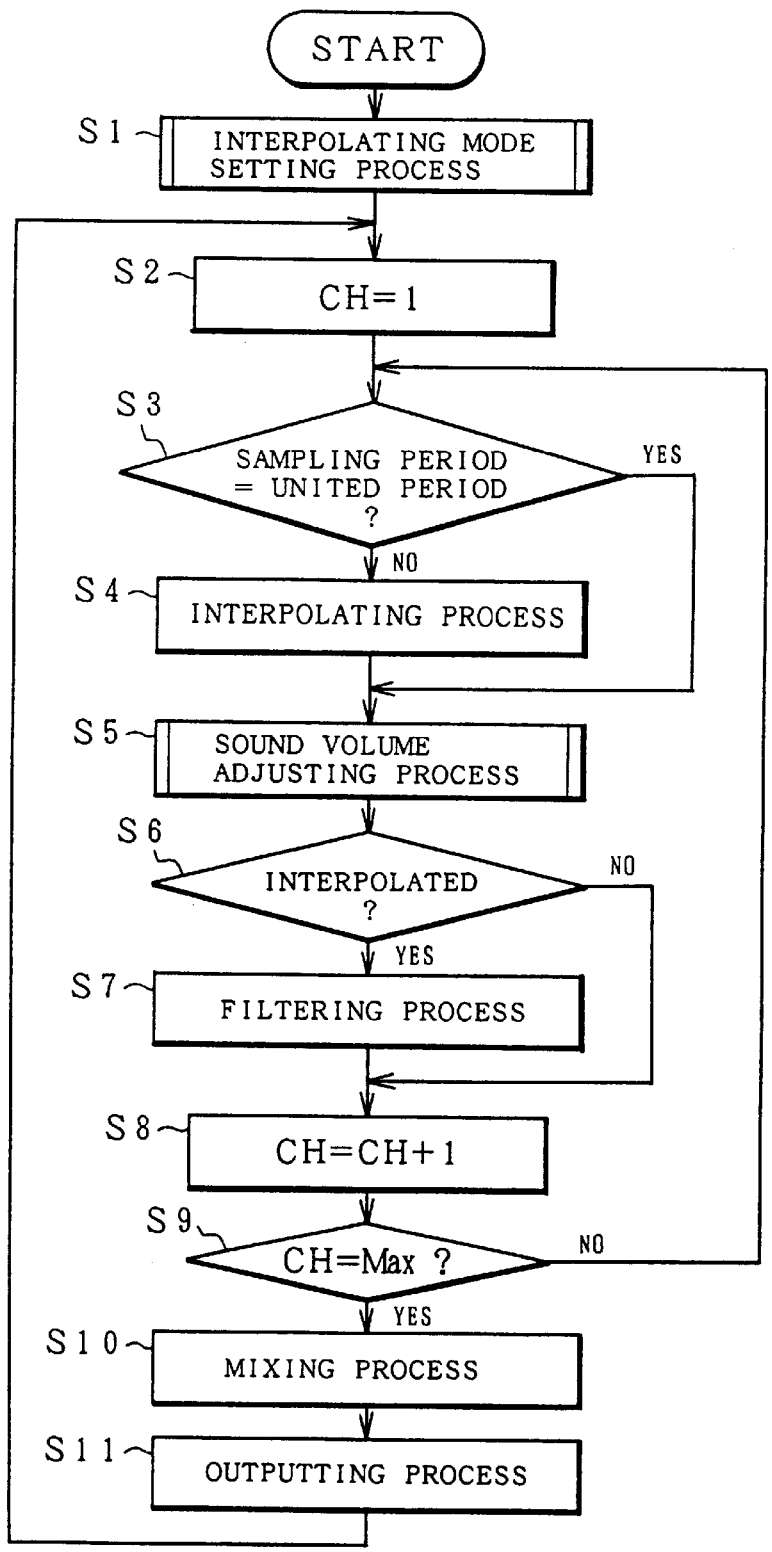
FIG. 26 is a flowchart for an input channel process in FIG. 25.

A flowchart of FIG. 26 shows a processing procedure of the mixer input unit 230-1 of the channel CH1 in FIG. 25. First in step S1, an interpolating mode is set. In the interpolating mode setting process is executed with respect to all of the input channels CH1 to CH5. After completion of the sampling clock measuring process, the channel CH=1 is first set in step S2. In step S3, a check is made to see if the sound source sampling period Ts of the channel CH1 is equal to the united sampling period Tu. When they are different, the interpolating process is executed in step S4. When they are equal, the interpolating process in step S4 is not performed. In step S5, a sound volume adjusting process is executed. In step S6, the presence or absence of the interpolating process is checked. When the interpolating process has been performed, a filtering process is executed in step S7. After completion of the filtering process, the channel CH1 is increased by "1" in step S8. In step S9, a check is made to see if the process has reached the final channel. The above processes in steps S3 to S9 are repeated until the process reaches the final channel CH5. When the completion of the process of the final channel CH5 is discriminated in step S9, a mixing process is executed in step S10. After that, an outputting process is executed in step S11. The processes in steps S2 to S11 are repeated at every period Tu corresponding to the united sampling frequency 44.1 kHz.

Figure 27:
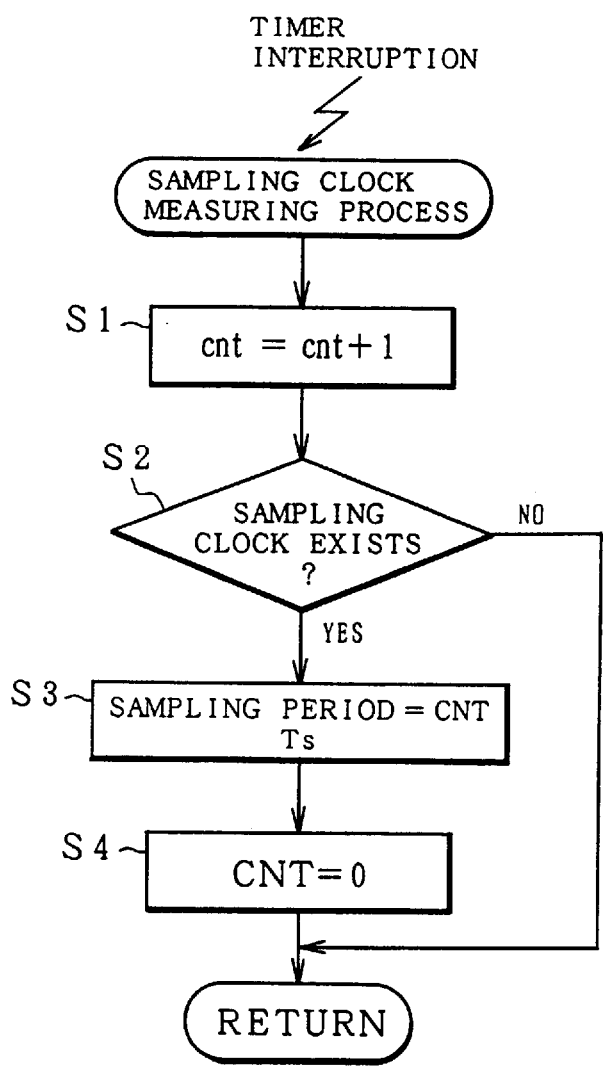
FIG. 27 is a flowchart for a sampling clock measuring process in FIG. 26.

FIG. 27 is a flowchart showing the details of an interrupting process to measure the sound source sampling period Ts which is used in the interpolating mode setting process in step S1 in FIG. 26. The interrupting process is activated by a timer interruption which occurs at a very short period. First in step S1, the count value cnt is counted up. In step S2, the presence or absence of the sampling clock from the input channel is discriminated. When the sampling clock is derived, the sound source sampling period Ts is obtained from the count value cnt of the counter in step S3. The count value cnt is cleared to 0 in step S4. When no sampling clock is obtained in step S2, the interrupting process is finished.

Figure 28:
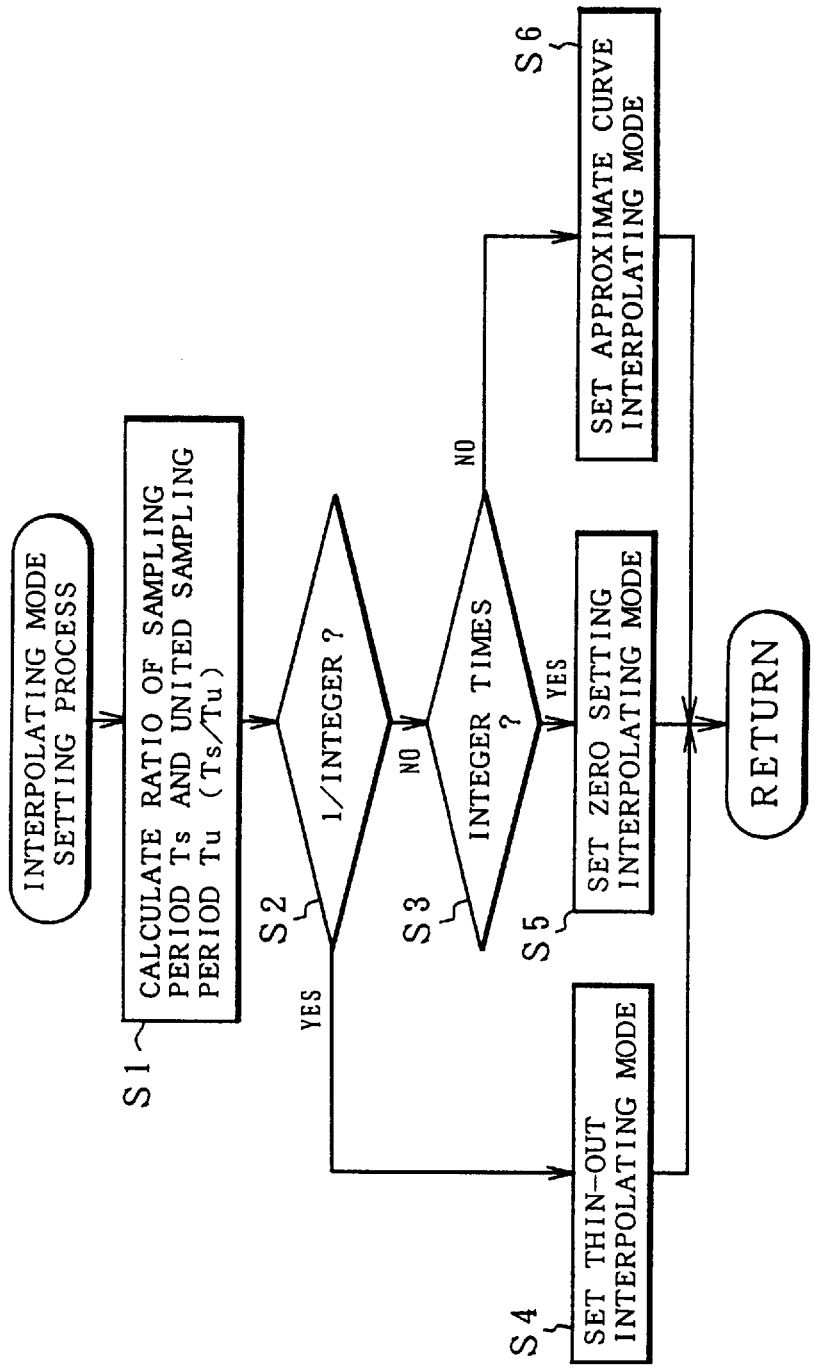
FIG. 28 is a flowchart for an interpolating mode setting process in FIG. 26.

FIG. 28 is a flowchart showing the details of the interpolating mode setting process in step S1 in FIG. 26. In the interpolating mode setting process, a ratio (Ts/Tu) between the sound source sampling period Ts and the united sampling period Tu is first calculated in step S1. A check is made in step S2 to see if the ratio is equal to a value of (1/integer). If YES, step S4 follows and a thin-out mode of the sample data is set. If NO in step S2, step S3 follows and a check is made to see if the ratio is equal to a value of integer times. If YES, step S5 follows and a zero-setting interpolating mode is set. If NO in step S3, an approximate curve interpolating mode is set, for example, a linear interpolating mode is set in step S6.

Figure 29:
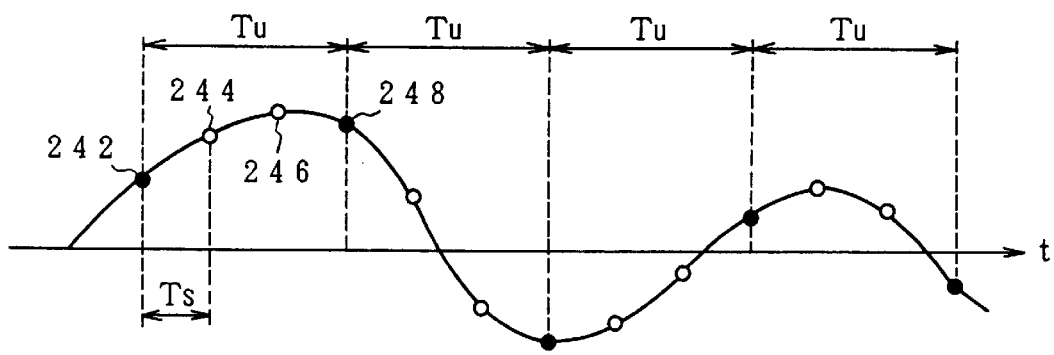
FIG. 29 is an explanatory diagram of a thin-out process.

FIG. 29 shows a thin-out process in the case where the thin-out mode in step S4 in FIG. 28 is set. First, since the input sound source sampling period Ts is shorter than the united sampling period Tu, sample data 244 and 246 between sample data 242 and 248 synchronized with the united sampling period Tu are not held as sample data but are thinned out. Thus, the sample data can be converted into the sample data shown by black dots having the united sampling period Tu.

Figure 30:
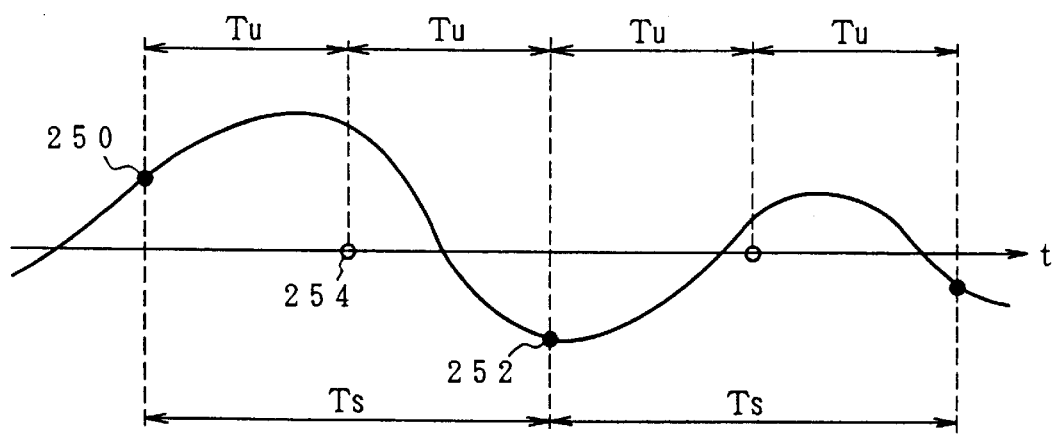
FIG. 30 is an explanatory diagram of a zero-setting interpolating process.

FIG. 30 shows the zero-setting interpolating process in the case where the zero-setting interpolating mode in step S5 in FIG. 28 is set. In this case, the input sampling period Ts is longer to be, for example, two times as long as the united sampling period Tu. The sample data at the sound source sampling period Ts which is obtained at a period of 2Tu is as shown in, for example, sample data 250 and 252. Zero data 254 is interpolated with respect to the interpolating position of the timing of the united sampling period Tu existing between the sample data 250 and 252. In the zero-setting interpolation as mentioned above, after the zero-setting interpolating process was performed, the data is transmitted through a low pass filter by the filtering process and the whole level decreases due to the zero-setting interpolation. Therefore, a level adjusting process to raise the level is executed.

Figure 31:
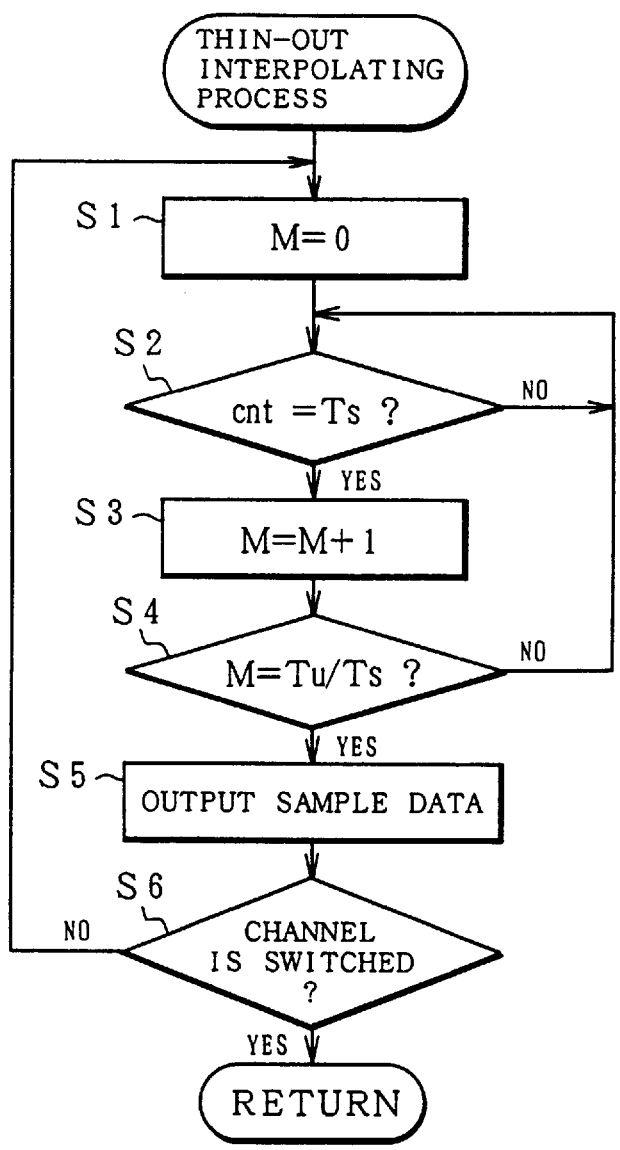
FIG. 31 is a flowchart for the thin-out process in FIG. 28.

A flowchart of FIG. 31 relates to the thin-out process in FIG. 29. First in step S1, a counter M to count the number of sample data which is obtained for the united sampling period Tu is cleared to M=0. A check is subsequently made to see if the count value cnt which is cleared to 0 each time the sample data is obtained coincides with the input sound source sampling period Ts which has already been measured. In step S2, the count value cnt coincides with the input sound source sampling period Ts, the processing routine advances to step S3 and the counter M is counted up by "1". In step S4, a check is made to see if the count value of the counter M has reached the ratio (Tu/Ts) between the united sampling period Tu and the sound source sampling period Ts. For example, in FIG. 29, a check is made to see if the count value has reached M=3. The processes in steps S2 to S4 are repeated until the count value reaches M=3. The sample data is not outputted. When M=3 in step S4, the sample data at that time is outputted in step S5. In step S6, the presence or absence of the switching of the channel input is discriminated. The processes in steps S1 to S6 are repeated until the channel input is switched. When the channel input is switched, the processing routine is again returned to FIG. 28 and the interpolating mode setting process in a new switched channel is executed.

Figure 32:
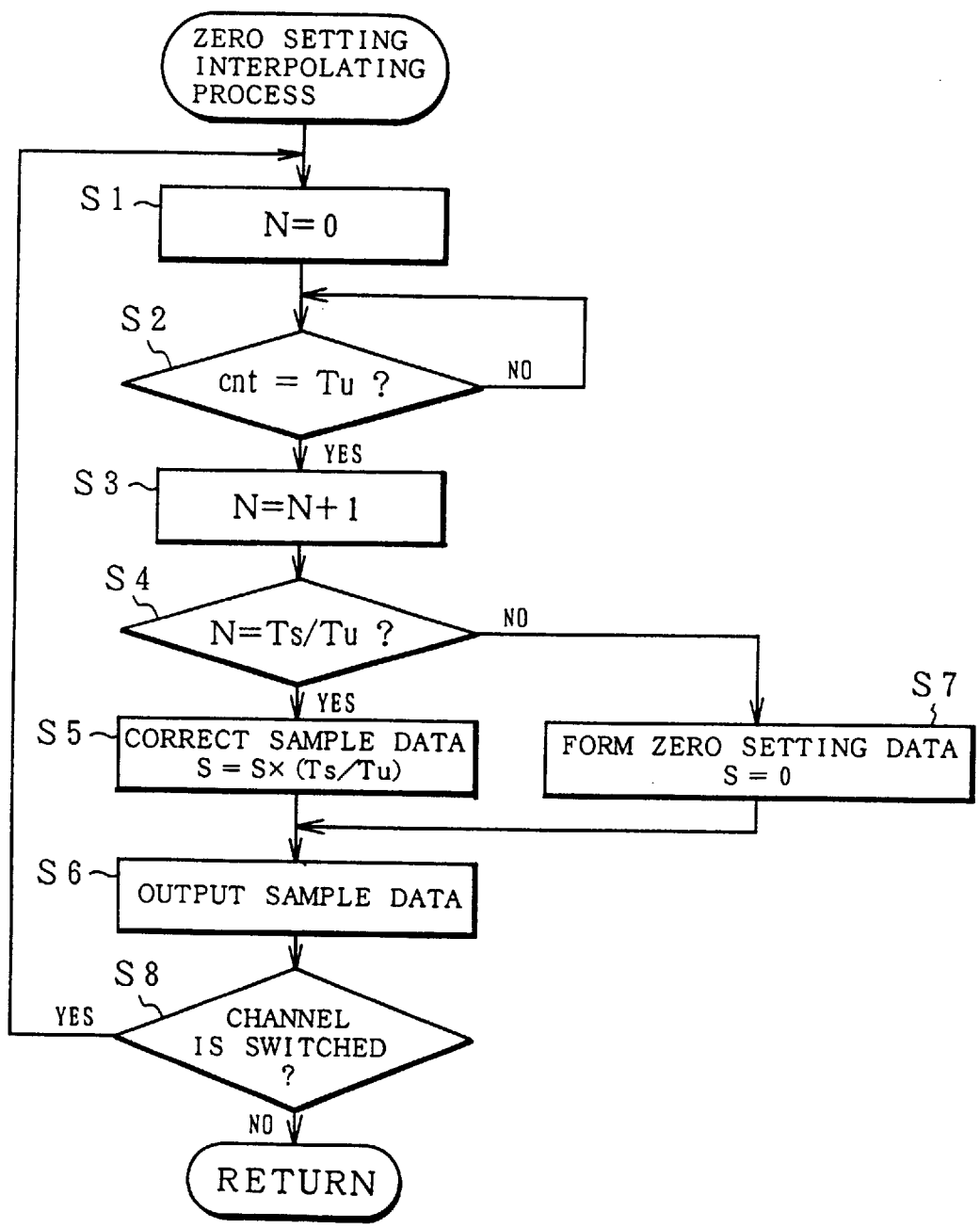
FIG. 32 is a flowchart for the zero-setting interpolating process in FIG. 28.

FIG. 32 is a flowchart for the zero-setting interpolating process in FIG. 30. First in step S1, a counter N indicative of the number of interpolation data, namely, the zero-setting data existing for the sound source sampling period Ts is cleared to 0. In step S2, a check is made to see if the count value cnt which is cleared to 0 at every sound source sampling period Ts has reached the united sampling period Tu. When the count value cnt reaches the united sampling period Tu, the counter N is counted up by "1" in step S3. In step S4, a check is made to see if the ratio (Ts/Tu) between the input sound source sampling period Ts and the united sampling period Tu has reached N=2 in case of FIG. 30. When the count value cnt reaches N=2 in step S4, since this means that the timing is the next sampling timing, the sample data inputted is corrected to, for example, (TS/Tu)=2 times in order to compensate a decrease in level in association with the zero-setting interpolation. After that, the sample data is outputted in step S6. When the count value doesn't reach N=2 in step S4, the zero-setting data of S=0 is formed in step S7 and is outputted as interpolation setting sample data in step S6. In step S8, a check is made to see if the channel input has been switched. The processes in steps S1 to S7 are repeated until the channel input is switched.

[Sound volume adjusting control]

In the audio data processing apparatus of the invention, a sound volume is set by the volume operation with respect to the ordinary digital audio input channel. For the volume setting by the volume operation as mentioned above, when the sound volume is accurately adjusted for a sudden change in volume adjustment value, digital noises are generated due to a sudden sound volume change. The embodiment of FIG. 33, therefore, is characterized in that the sound volume is controlled so as to reduce the noises which are generated due to a discontinuity of the audio waveform of the sudden sound volume change value. First, registers 260, 262, and 264 are provided at the input stage. The output data X is fed back into the register 260 and a present value A is held. A sound volume set value B from the outside in association with the volume adjustment is held in the register 262. Further, an advance value C which is changed for the processing period Tu of the predetermined united sampling frequency 44.1 kHz by the sequencer 84 is held in the register 264. The present value A in the register 260 and the advance value C in the register 264 are supplied to an operating unit 266. A sound volume adjusting arithmetic operation of X=A±C is executed at every processing period Tu by the sequencer 84. The present value A in the register 260 and the sound volume set value B (target value) set by the external volume are compared by a comparing unit 268. The addition or subtraction of the advance value C in the operating unit 266 is determined on the basis of the comparison result of the comparing unit 268. When the set value B is larger than the present value A, the operating unit 266 executes the addition of X=A+C. When the set value B is smaller than the present value A, the operating unit 266 performs the subtraction of X=A−C. The operation output X of the operating unit 266 is compared with the set value B by a comparing unit 272. The comparing unit 272 controls a selector 270 in accordance with the comparison result. When the operation output X doesn't coincide with the set value B, the selector 270 selects the output X of the operating unit 266 and generates as output data X. When the output X of the comparing unit 272 coincides with the set value B, the selector selects the set value B and generates as output data X.

Figure 33:
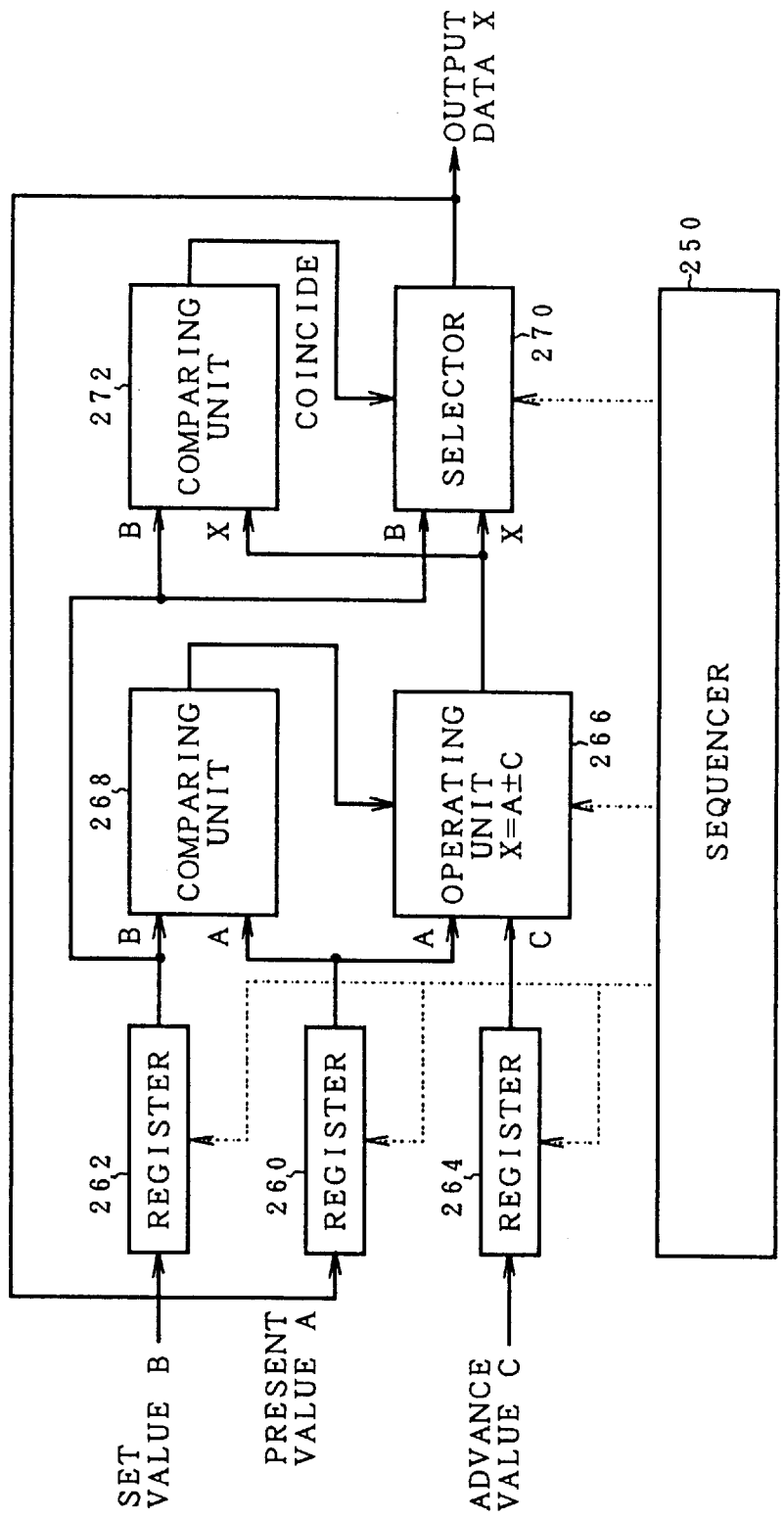
FIG. 33 is a functional block diagram of a sound volume adjusting process which is used in the invention.
Figure 34:
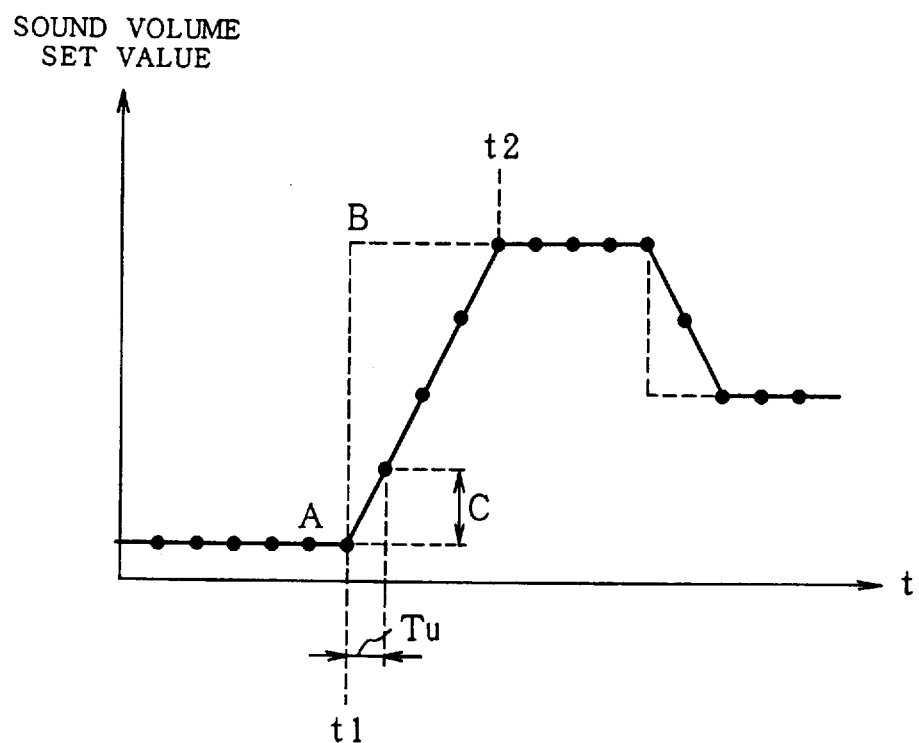
FIG. 34 is a time chart for a sound volume adjustment according to FIG. 33.

FIG. 34 is a time chart for the sound volume control in FIG. 33. It is now assumed that a new set value B is set by a volume setting from the outside for the present value A. From time t1, an arithmetic operation of A+C is executed by the operating unit 266 at every processing period Tu that is decided by a sequencer 250. The output X of the operating unit 266 is increased by the advance value C at a time. The output X coincides with the set value B at time t2. The selector 270 selects and outputs the output X of the operating unit 266 for a period of time between time t1 and time t2. When the time reaches t2, the selector 270 selects and outputs the set value B. Thus, even if there is a sudden change in sound volume set value, the data that is actually outputted has a time gradient limited by the advance value C. The generation of noises due to a discontinuity of the audio waveform by the sudden sound volume change can be certainly prevented.

Figure 35:
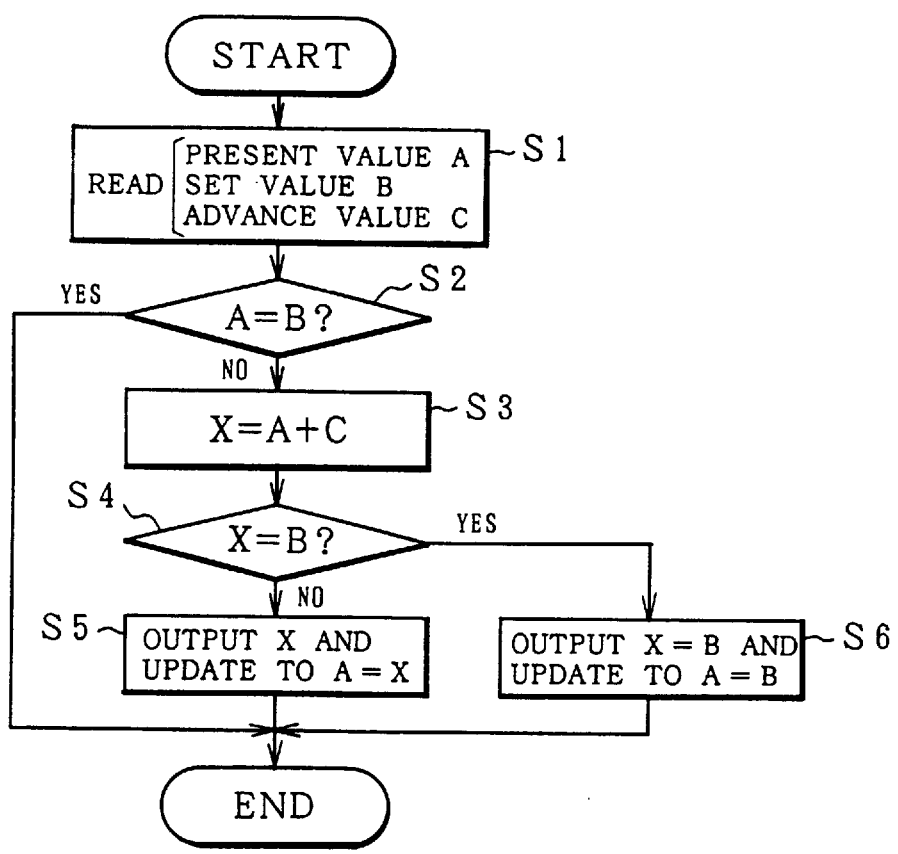
FIG. 35 is a flowchart for the sound volume adjusting process in FIG. 33.

FIG. 35 is a flowchart in the case where the functional block of FIG. 33 is realized by a program control by the processor. First in step S1, the present value A, set value B, and advance value C are read. In step S2, a check is made to see if the present value A coincides with the set value B. When they differ, the advance value C is added to the present value A in step S3. In the addition of the advance value C in this case, when the present value A is smaller than the set value B, −C is added. When A > B, C is added. In step S4, a check is made to see if the output X has reached the set value B. Until the output X coincides with the set value B, the operation result X in step S3 is outputted and the present value A is updated to A=X in step S5. When the operation value X coincides with the set value B in step S4, X=B is outputted and the present value A is updated to the set value B in step S6.

Figure 36:
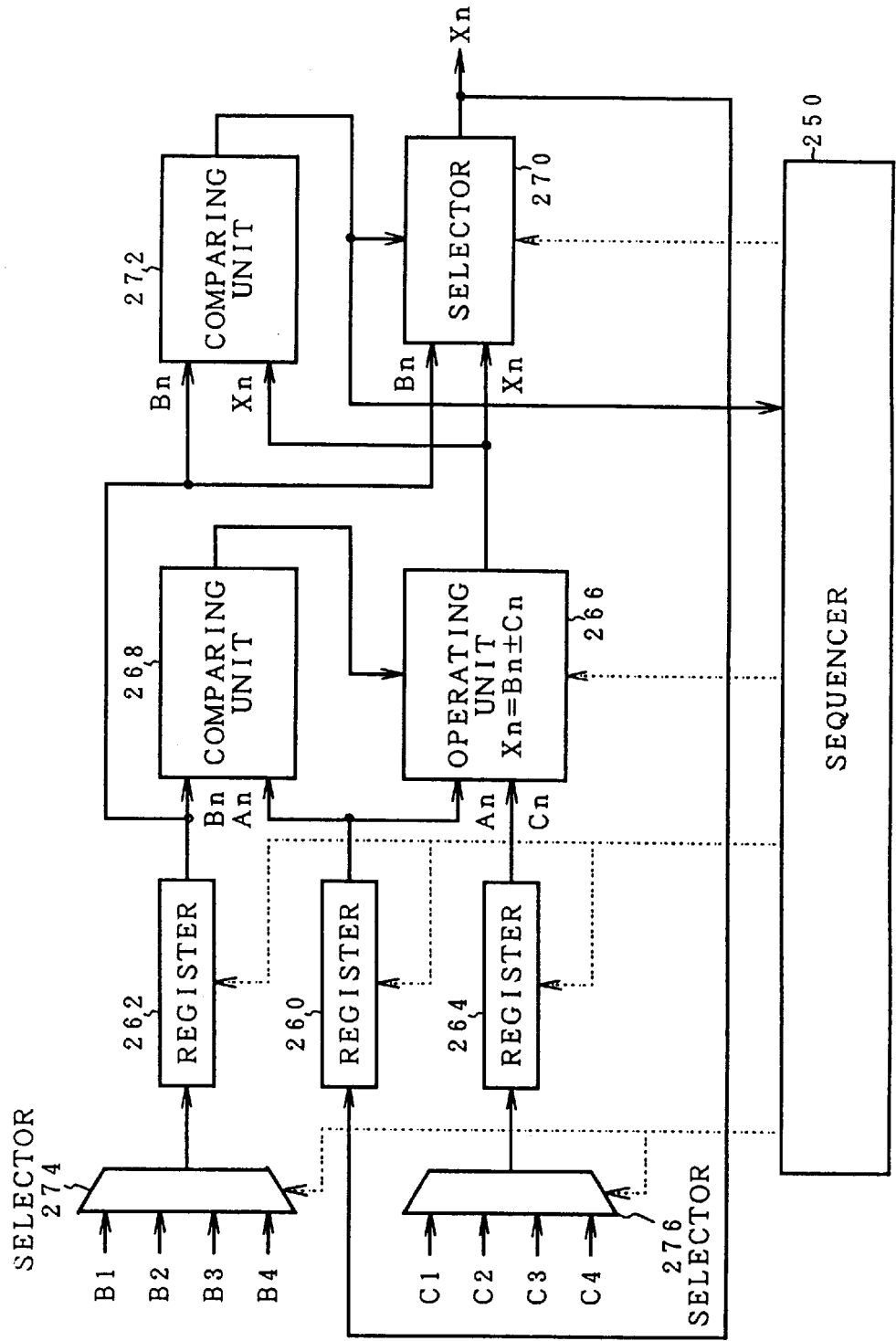
FIG. 36 is a functional block diagram of an envelope process in association with a key input of a digital playing apparatus to which the sound volume adjustment in FIG. 33 is applied.

FIG. 36 is characterized in that an envelope adjustment of an audio waveform for a key operation of an electronic playing apparatus is easily realized by using the control function of the sound volume adjustment shown in FIGS. 33 to 35. In the functional block of FIG. 36, a selector 274 is newly provided for the register 262 on the input side and a selector 276 is newly provided for the register 264 for FIG. 33. Sound volume set values B1, B2, B3, and B4 corresponding to an aging change of the key are inputted to the selector 274. Peculiar advance values C1, C2, C3, and C4 corresponding to the sound volume set values B1 to B4 are set for the selector 276. The sequencer 250 advances to the next sequence each time the present value A reaches any one of set values P1 to P4. Generally, four modes of attack, decay, sustain, and release are set for the ON operation of the key input. In correspondence to those four modes, the sound volume set values B1 to B4 to the selector 274 and the advance values C1 to C4 to change to the respective sound volume set values are set.

Figures 37A, 37B:
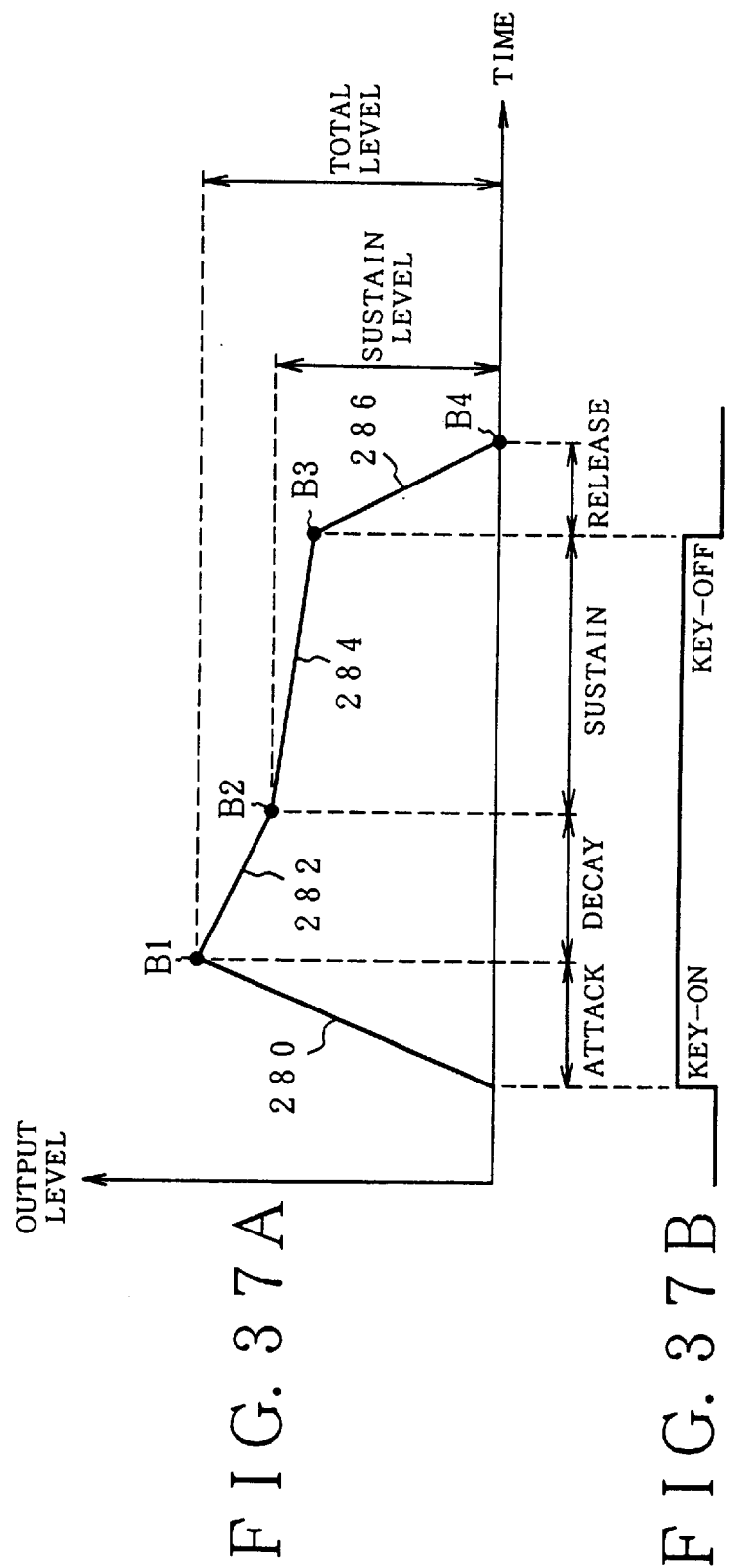
FIGS. 37A and 37B are time charts of the envelope process in FIG. 36.

For example, for a key input as shown in FIG. 37B, the sound volume set values B1, B2, B3, and B4 of four modes of attack, decay, sustain, and release as shown in FIG. 37A are determined. The peculiar advance values C1 to C4 are used as advance values of the unit period Tu in attacking characteristics 280, decay characteristics 282, sustaining characteristics 284, and releasing characteristics 286. A generating process of an envelope waveform in a state in which the set values B1 to B4 and the advance values C1 to C4 are set as mentioned above is executed as follows. First, the sequencer 250 selects the sound volume set value B1 and advance value C1 in the attacking mode by the selectors 274 and 276 and sets into the registers 262 and 264. In this state, the sequencer 250 repeats the addition of the advance value C1 to the present value A by the operating unit 266 on the basis of the comparison result by the comparing unit 268 between the sound volume set values B1 in the registers 260 and 262 in which the present values have been stored at every processing period Tu. When it is discriminated by the comparing unit 272 that the value has reached the set value B1, a coincidence output is supplied to the sequencer 250. The sound volume set value B2 and advance value C2 in the next decay mode are selected by the selectors 274 and 276. In a manner similar to the above, similar processes are repeated with respect to the sustaining mode and releasing mode, respectively. Thus, an envelope waveform of FIG. 37A can be generated in correspondence to the key operation from the key ON to the key OFF in FIG. 37B.

Figure 38:
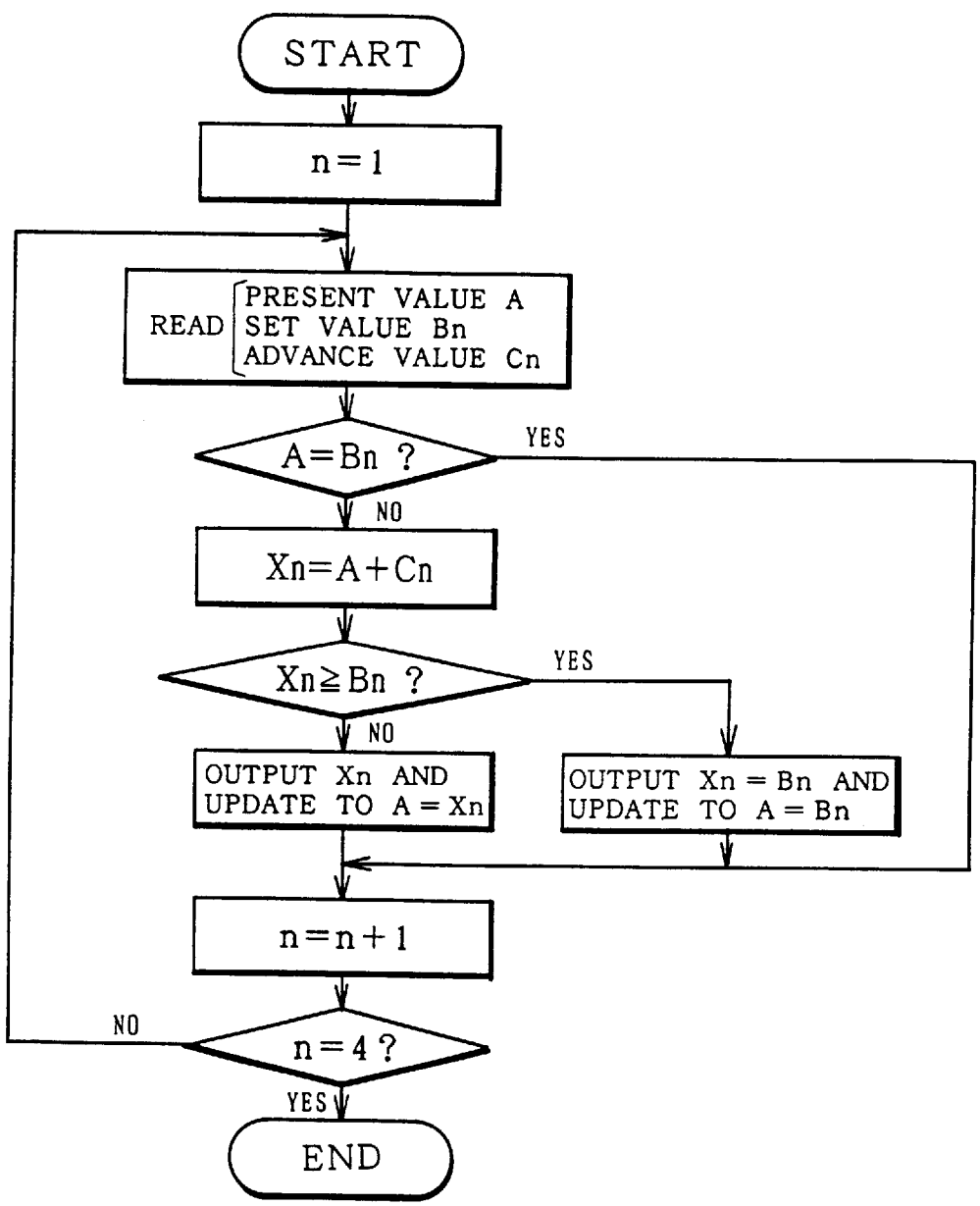
FIG. 38 is a flowchart for the envelope process in FIG. 36.

FIG. 38 shows a flowchart for the processes in FIG. 36. Processes similar to those in case of the sound volume adjustment by the volume in FIG. 35 are repeated only n=4 times that is decided by the counter n.

According to the invention as mentioned above, the digital audio data of the different sound source sampling frequencies from a plurality of digital sound sources is inputted and can be processed while uniting those different sound source sampling frequencies to a predetermined united sampling frequency such as 44.1 kHz. The digital sound source side doesn't always need to generate the data of the united frequency of 44.1 kHz. By using the apparatus of the invention as an interface of the audio data to the computer apparatus, various digital sound sources can be subjected to necessary audio processes in a lump.

By using the hardware in which the multiplication pipeline circuit and the addition/subtraction pipeline circuit are mutually connected as a logic circuit for performing the time-division processes of the multi-channel digital data, the processes of the multi-channel audio data can be efficiently time-divisionally processed in a processing period of the united sampling frequency 44.1 kHz. The logic circuit itself is also simple and the control process can be also performed only by the unconditional address designation of the control memory by the sequencer, so that the multi-channel processes can be realized by a simple circuit.

Further, by allowing the data processing circuit to have a flexibility as a software process by the processor, the sound source sampling frequencies of proper digital audio data are measured, the interpolating process and thin-out process which are necessary are executed according to the relation between the measured sound source sampling frequencies and the united sampling frequency, and the conversion into the united sampling frequency 44.1 kHz can be automatically efficiently performed by the interpolation and thin-out on the apparatus side without being aware of the sound source sampling frequencies of the external digital sound sources. The interpolating process can be also properly executed in accordance with the situations of the sound source sampling frequencies.

The invention is not limited by the numerical values shown in the above embodiments.

What is claimed is:

1. An audio data processing apparatus for inputting one or a plurality of audio data and, after that, performing data processes and outputting the processed data, comprising:

a plurality of input channels for inputting the audio data; and a data processing circuit to which said plurality of input channels are inputted and connected in parallel and which individually time-divisionally performs necessary data processes to the audio data of each of said input channels at every period Tu that is decided by a standardized predetermined united sampling frequency and, after that, mixes the processed data and generates mixed data, wherein in the case where said united sampling frequency and sound source sampling frequencies of said audio data are different, said data processing circuit arithmetically operates interpolation data synchronously with said united sampling frequency and converts into the audio data of said united sampling frequency, wherein said data processing circuit executes the arithmetic operation of said interpolation data on the basis of a linear approximation, wherein for the arithmetic operation of said interpolation data based on the linearly approximation, said data processing circuit includes:

a data holding unit for holding at least three continuous sample data S(n), S(n−1), and S(n−2) at every said sampling period;

a delay period number setting unit for setting the number (Nd) of delay periods until a past period to calculate the interpolation data in the case where "1" is added to a quotient obtained by dividing said sound source sampling period Ts by said united sampling period Tu and a resultant addition value reaches the united sampling period Tu;

a counter which is cleared at every said sound source sampling period Ts and counts a predetermined fundamental clock and generates a count value cnt;

a first time position operating unit for subtracting said count value cnt and said sound source sampling period Ts from a value (Tu*Nd) obtained by multiplying said delay period number Nd to said united sampling period Tu each time said fundamental clock is obtained, thereby calculating a first time position CT1 which is used for the arithmetic operation of said interpolation data;

a second time position operating unit for subtracting said count value cnt from a value obtained by multiplying said delay period number Nd to said united sampling period Tu each time said fundamental clock is obtained, thereby calculating a second time position CT2 which is used for said arithmetic operation of said interpolation data;

a change-over selecting unit for comparing a difference ΔT between the value (Tu*Nd) obtained by multiplying said delay period number Nd to said united sampling period Tu and said sound source sampling period Ts with said count value cnt, in the case where said count value cnt is equal to or less than said difference ΔT, selecting said first time position CT1 as an interpolation time position C and selecting the one-preceding data S(n−1) and the two-preceding data S(n−2) as new data A and old data B, and in the case where said count value cnt exceeds said difference ΔT, selecting said second time position CT2 as an interpolation time position CT and selecting the present data S(n) and the one-preceding data S(n−1) as new data A and old data B; and an interpolation operating unit for arithmetically operating interpolation data X based on the linear approximation on the basis of said new and old data A and B selected by said change-over selecting unit and said interpolation time position C each time a period reaches said united sampling period Tu.

2. An apparatus according to claim 1, wherein in the case where said two new and old data are set to A and B and the interpolation time position is set to C and the sound source sampling period Ts is set to D, said interpolation operating unit calculates the interpolation data X by $$X = A - (A-B)C/D.$$

3. An audio data processing apparatus according to claim 1, wherein said data processing circuit is a low pass filter for eliminating a high frequency noise component of the input data and arithmetically operates output data from a filter coefficient according to a finite impulse response.

4. An apparatus according to claim 3, wherein said data processing circuit arithmetically operates filter output data of said target data which is at present a target to be processed by a sum of products between the input data of a predetermined degree at every united sampling period existing on time bases before and after said target data as a center and a filter coefficient of a fixed degree according to said finite impulse response.

5. An audio data processing apparatus for inputting one or a plurality of audio data and, after that, performing data processes and outputting the processed data, comprising:

a plurality of input channels for inputting the audio data; and a data processing circuit to which said plurality of input channels are inputted and connected in parallel and which individually time-divisionally performs necessary data processes to the audio data of each of said input channels at every period Tu that is decided by a standardized predetermined united sampling frequency and, after that, mixes the processed data and generates mixed data, wherein in the case where said united sampling frequency and sound source sampling frequencies of said audio data are different, said data processing circuit executes a process to convert the audio data of said input channels into data of said united sampling frequency, wherein said data processing unit measures the sound source sampling period Ts of said input data and executes a different converting process in accordance with a result of said measurement.

6. An apparatus according to claim 5, wherein said data processing unit measures the sound source sampling period Ts of said input data and, in the case where a ratio (Ts/Tu) between said sound source sampling period Ts and said united sampling period Tu is equal to a value of (1/integer), executes a thin-out process to eliminate the data at every sound source sampling period Ts existing for said united sampling period Tu.

7. An apparatus according to claim 5, wherein said data processing unit measures the sound source sampling period Ts of said input data and, in the case where a ratio (Ts/Tu) between said sound source sampling period Ts and said united sampling period Tu is equal to a value of non-integer times or (1/non-integer), inserts interpolation data by a linear approximation to positions of said united sampling period Tu for said sound source sampling period Ts, thereby performing a linear interpolation.

8. An apparatus according to claim 7, wherein for the arithmetic operation of said interpolation data based on the linear approximation, said data processing circuit has:

a data holding unit for holding at least three continuous sample data S(n), S(n−1), and S(n−2) at every said sound source sampling period;

a delay period number setting unit for setting the number (Nd) of delay periods until a past period to calculate the interpolation data when "1" is added to a quotient obtained by dividing said sound source sampling period Ts by said united sampling period Tu and a resultant addition value reaches the united sampling period Tu;

a counter which is cleared each time a sampling clock is obtained and counts a predetermined fundamental clock and outputs a count value cnt;

a first time position operating unit for subtracting said count value cnt and said sound source sampling period Ts from a value (Tu*Nd) obtained by multiplying said delay period number Nd to said united sampling period Tu each time said fundamental clock is obtained, thereby calculating a first time position CT1 which is used for the arithmetic operation of the interpolation data;

a second time position operating unit for subtracting said count value cnt from a value obtained by multiplying said delay period number Nd to said united sampling period Tu each time said fundamental clock is obtained, thereby calculating a second time position CT2 which is used for the arithmetic operation of said interpolation data;

a change-over selecting unit for comparing a difference ΔT between the value (Tu*Nd) obtained by multiplying said delay period number Nd to said united sampling period Tu and said sound source sampling period Ts with said count value cnt and, in the case where said count value cnt is equal to or less than said difference ΔT, selecting said first time position CT1 as an interpolation time position C and selecting two data of the one-preceding data S(n−1) and the two-preceding data S(n−2) as new data A and old data B, and in the case where said count value cnt exceeds said difference ΔT, selecting said second time position CT2 as an interpolation time position CT and selecting two data of the present data S(n) and the one-preceding data S(n−1) as new data A and old data B; and an interpolation operating unit for arithmetically operating interpolation data X based on the linear approximation on the basis of the new and old data A and B selected by said change-over selecting unit and said interpolation time position C each time a period reaches said united sampling period Tu.

9. An apparatus according to claim 8, wherein in the case where said two new and old data are set to A and B and the interpolation time position is set to C and the sound source sampling period Ts is set to D, said interpolation operating unit calculates the interpolation data X by $$X = A - (A-B)C/D.$$

10. An audio data processing apparatus according to claim 5, wherein said data processing circuit is a low pass filter for eliminating a high frequency noise component of the input data and arithmetically operates output data from a filter coefficient according to a finite impulse response.

11. An apparatus according to claim 10, wherein said data processing circuit arithmetically operates filter output data of said target data which is at present a target to be processed by a sum of products between the input data of a predetermined degree at every united sampling period existing on time bases before and after said target data as a center and a filter coefficient of a fixed degree according to said finite impulse response.

12. An apparatus according to claim 5, wherein said data processing unit measures the sound source sampling period Ts of said input data and, in the case where a ratio (Ts/Tu) between said sound source sampling period Ts an d said united sampling period Tu is equal to a value of integer times, inserts zero data to positions of said united sampling period Tu for said sound source sampling period Ts, thereby interpolating.

13. An audio data processing apparatus for inputting one or a plurality of audio data and, after that, performing data processes and outputting the processed data, comprising:

a plurality of input channels for inputting the audio data; and a data processing circuit to which said plurality of input channels are inputted and connected in parallel and which individually time-divisionally performs necessary data processes to the audio data of each of said input channels at every period Tu that is decided by a standardized predetermined united sampling frequency and, after that, mixes the processed data and generates mixed data, wherein said data processing circuit includes:
- a first processing circuit for time-divisionally executing an interpolation, sound volume adjustment, and mixing output of the audio data as many as said plurality of channels at every said united sampling period Tu; and
- a second processing circuit for time-divisionally executing filtering processes as many as said plurality of channels at every said united sampling period Tu, wherein each of said first and second processing circuits comprises:
- a multiplication pipeline circuit for selecting two of said plurality of input data and, after that, multiplying said two selected input data;
- an addition/subtraction pipeline circuit for selecting two of said plurality of input data and, after that, performing an addition or a subtraction to said two selected input data;
- a data memory for reading out the input data and writing output data from/to said multiplication pipeline circuit and said addition/subtraction pipeline circuit;
- a control memory in which control patterns for making said multiplication pipeline circuit and said addition/subtraction pipeline circuit operative in said united sampling period Tu have been stored at every fundamental clock period; and
- a sequence counter for repeating a counting operation of said fundamental clock at every said united sampling period Tu, generating addresses, reading out operation patterns from said control memory by said addresses, and allowing said multiplication pipeline circuit and said addition/subtraction pipeline circuit to time-divisionally execute processes as many as said plurality of input channels.

14. An apparatus according to claim 13, wherein:

said multiplication pipeline circuit comprises
- a first selector to select one of said plurality of input data,
- a second selector to select one of said plurality of input data,
- a first register to hold an output of said first selector,
- a second register to hold an output of said second selector,
- a multiplier to multiply values in said first and second registers, and
- a first output register to hold an output of said multiplier; and said addition/subtraction pipeline circuit comprises
- a third selector to select one of said plurality of input data,
- a fourth selector to select one of said plurality of input data,
- a third register to hold an output of said third selector,
- a fourth register to hold an output of said fourth selector,
- an adder/subtracter to perform an addition or a subtraction to values in said third and fourth registers,
- a second output register to hold an output of said adder/subtracter, and
- a multiplexer to select said first or second output register.

15. An apparatus according to claim 14, wherein the outputs of said first and second output registers are fed back and connected to said first to fourth selector inputs as necessary.

16. An apparatus according to claim 15, wherein each of said first output register provided subsequent to said multiplier and said second output register provided subsequent to said adder/subtracter has a function as a shift register, and when an outputting operation is designated by said operation pattern, said first and second output registers hold the output data of said adder/subtracter, and when a shifting operation is designated by said operation pattern, said first and second output registers shift up or down the data held.

17. An apparatus according to claim 14, wherein said addition/subtraction pipeline circuit of said second processing circuit for performing a filtering process directly feeds back and connects the output of said adder/subtracter to the selector input side.

18. An apparatus according to claim 17, wherein a masking circuit to mask a part of feedback data is provided for a feedback connecting circuit to the input side of said first and second output registers.

19. An audio data processing apparatus according to claim 13, wherein said data processing circuit is a low pass filter for eliminating a high frequency noise component of the input data and arithmetically operates output data from a filter coefficient according to a finite impulse response.

20. An apparatus according to claim 19, wherein said data processing circuit arithmetically operates filter output data of said target data which is at present a target to be processed by a sum of products between the input data of a predetermined degree at every united sampling period existing on time bases before and after said target data as a center and a filter coefficient of a fixed degree according to said finite impulse response.

21. An apparatus according to any one of claims 1, 5, 3 and 13 wherein said data processing circuit multiplies a set sound volume coefficient to the input data and generates sound volume adjusted data.

22. An apparatus according to any one of claims 1, 5, 3 and 13 wherein said data processing circuit corrects the input data to a specific level and, after that, multiplies a set sound volume coefficient to the corrected input data and generates sound volume adjusted data.

23. An apparatus according to any one of claims 1, 5, 3 and 13 wherein said data processing circuit multiplies a predetermined filter coefficient to the input data, thereby arithmetically operating output data.

24. An apparatus according to any one of claims 1, 5, 3 and 13 wherein said data processing circuit inputs and adds a plurality of data selected as targets to be mixed, thereby obtaining mixer output data.

25. An apparatus according to any one of claims 1, 5, 3 and 13 wherein said united sampling frequency is equal to 44.1 kHz and said united sampling period Tu is a reciprocal of said united sampling frequency.

26. An apparatus according to any of one of claims 1, 5, 3 and 13 wherein said plurality of input channels respectively input and connect an output of a PCM (wave table) sound source module, an output of an FM sound source module, an output of a microphone input circuit having an amplifier and an A/D converter, an output of a CD apparatus which is externally connected, a digital output of an audio apparatus which is externally connected, and transfer data of an external memory device which is externally connected through a data bus.

* * * * *